US012645307B2

(12) United States Patent
Ghassabian

(10) Patent No.: US 12,645,307 B2
(45) Date of Patent: Jun. 2, 2026

(54) SEARCH SYSTEM

(71) Applicant: Benjamin Firooz Ghassabian, Toulon (FR)

(72) Inventor: Benjamin Firooz Ghassabian, Toulon (FR)

( * ) Notice: Subject to any disclaimer, the term of this patent is extended or adjusted under 35 U.S.C. 154(b) by 0 days.

(21) Appl. No.: 18/843,377

(22) PCT Filed: Mar. 9, 2023

(86) PCT No.: PCT/IB2023/000122
§ 371 (c)(1),
(2) Date: Sep. 3, 2024

(87) PCT Pub. No.: WO2023/170473
PCT Pub. Date: Sep. 14, 2023

(65) Prior Publication Data
US 2025/0173002 A1    May 29, 2025

Related U.S. Application Data

(60) Provisional application No. 63/321,720, filed on Mar. 20, 2022, provisional application No. 63/319,336, filed on Mar. 13, 2022, provisional application No. 63/319,126, filed on Mar. 11, 2022.

(51) Int. Cl.
*G06F 3/023* (2006.01)

(52) U.S. Cl.
CPC ................................. *G06F 3/0237* (2013.01)

(58) Field of Classification Search
CPC .... G06F 3/0233; G06F 3/0236; G06F 3/0237; G06F 3/04886; G06F 40/274
See application file for complete search history.

(56) References Cited

U.S. PATENT DOCUMENTS

2007/0050337 A1* 3/2007 Venkataraman .... G06F 16/3322
2018/0081539 A1* 3/2018 Ghassabian ........... G06F 3/0236

* cited by examiner

*Primary Examiner* — Priyank J Shah

(57) ABSTRACT

A system for searching contents within a database of textual contents is described. Said contents and the corresponding databases may be of any kind such as movie titles, music titles, song titles, scientific terms, medical titles/terms, titles formed of one or more sequences of symbols, a list of telephone numbers, a contact list, etc. Upon providing one or more keyword, the search system provides a list one or more of corresponding contents to a user. According to one aspect, after selecting a presented content, by the user, a process corresponding to selected content is executed by a processor.

13 Claims, 10 Drawing Sheets

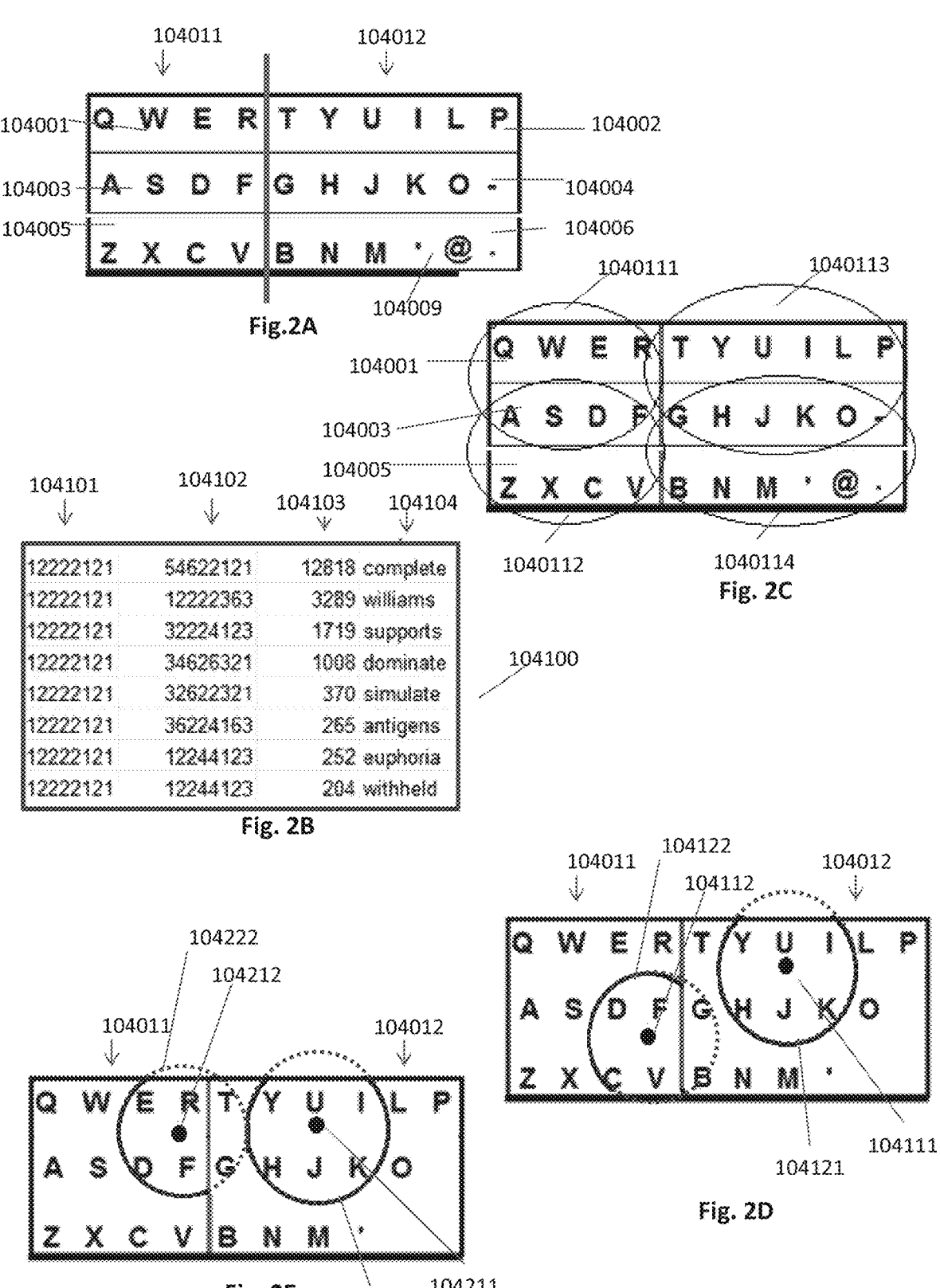

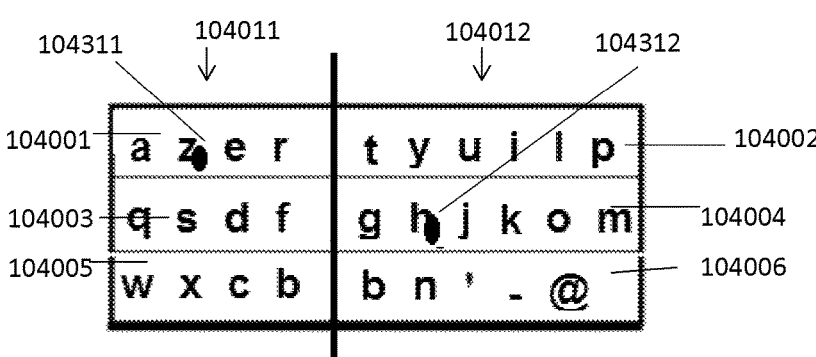
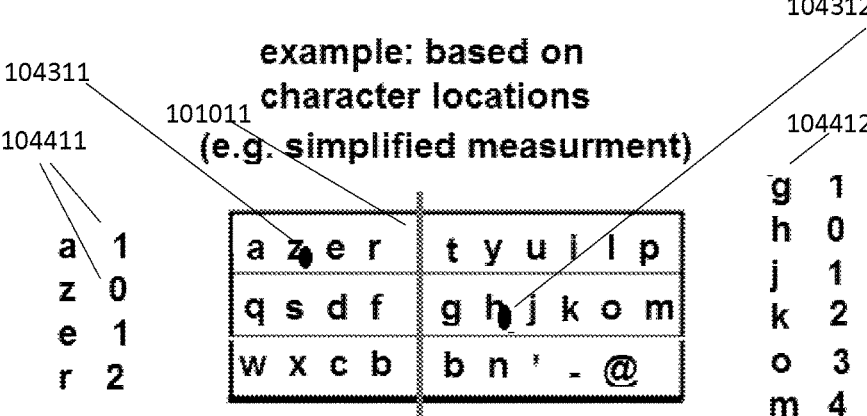
distance  from center of keys
all chars outside add    n
(e.g.  n > 5 )
Fig. 2F
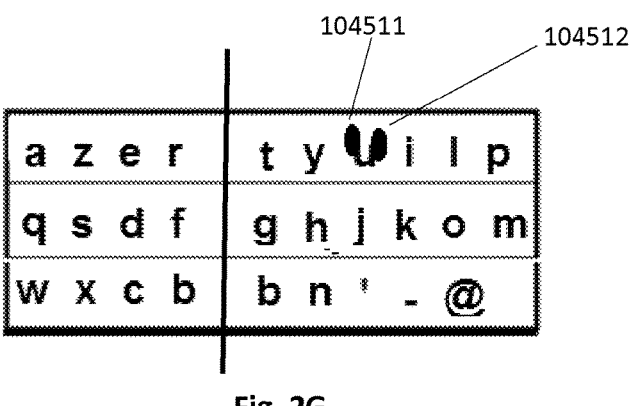
Fig. 2G distance  from center of keys all chars outside add    n (e.g.  n > 5 )

Figure 3:
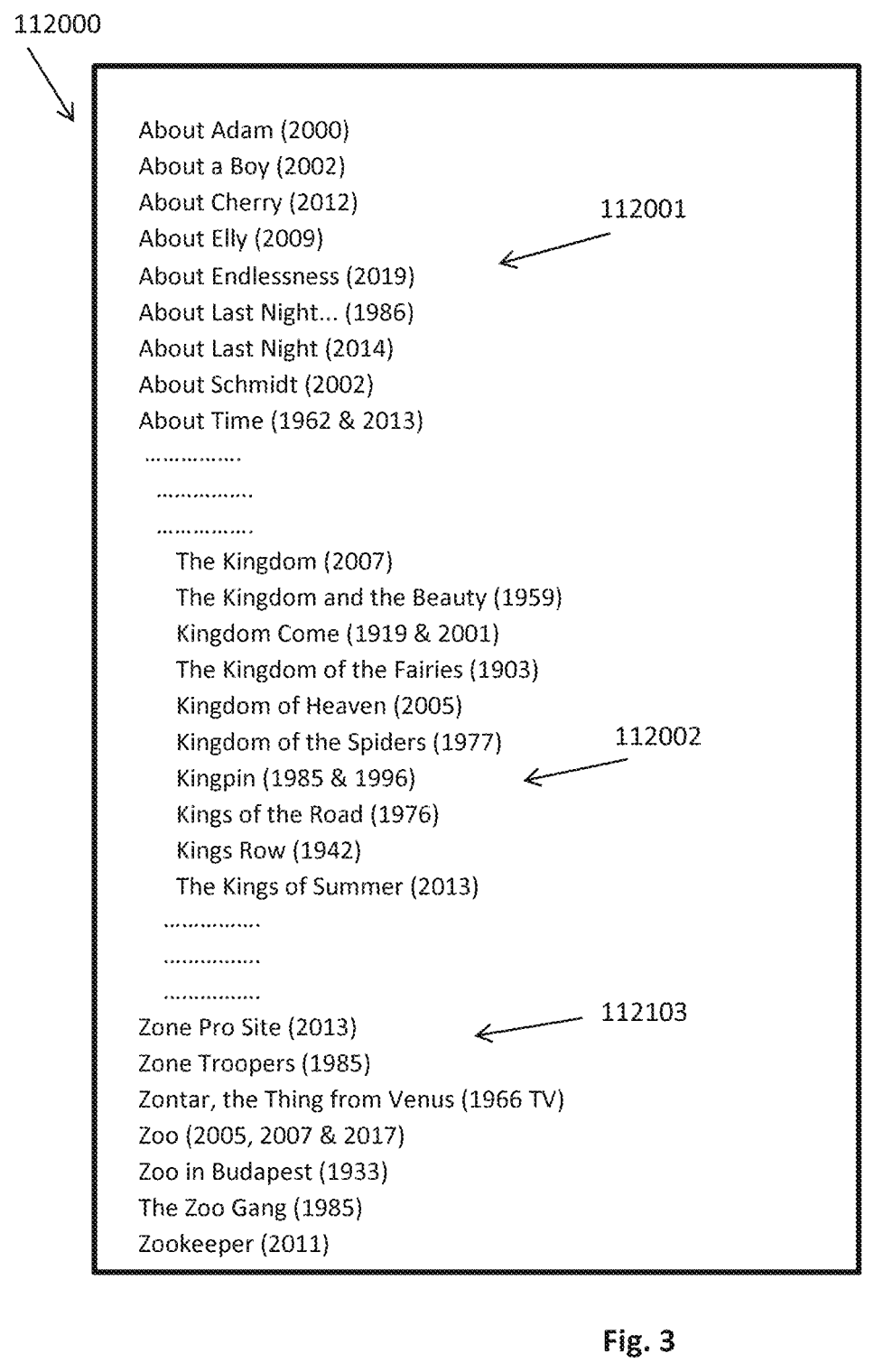

112000

About Adam (2000)
About a Boy (2002)
About Cherry (2012)
About Elly (2009)          112001
About Endlessness (2019)
About Last Night... (1986)
About Last Night (2014)
About Schmidt (2002)
About Time (1962 & 2013)
    ................
        .................
        ................

The Kingdom (2007)
    The Kingdom and the Beauty (1959)
    Kingdom Come (1919 & 2001)
    The Kingdom of the Fairies (1903)
    Kingdom of Heaven (2005)
    Kingdom of the Spiders (1977)          112002
    Kingpin (1985 & 1996)
    Kings of the Road (1976)
    Kings Row (1942)
    The Kings of Summer (2013)
        ................
        ................
        ................
Zone Pro Site (2013)          112103
Zone Troopers (1985)
Zontar, the Thing from Venus (1966 TV)
Zoo (2005, 2007 & 2017)
Zoo in Budapest (1933)
The Zoo Gang (1985)
Zookeeper (2011)

Keyword No.1 : 211222 (for the word "pretty")

Alice and Martin
All the Pretty Horses
114301
Alone in Berlin ——————————————— 114304
Along the Oregon Trail
American Beauty
The American Beauty
Baring It All
Bartok the Magnificent
Barton Fink
A Bath House Beauty
Bathing Beauty

............
............
............

114302
Pretty in Pink
Pretty Poison
Pretty Village Pretty Flame
Pretty Woman ———————————— 114305
Queen Margot

............
............
............

114303
Why Beauty Matters
Witchy Pretty Cure The Movie Wonderous Cure Mofurun
With Beauty and Sorrow
The Woman from Berlin
Yaanum Theeyavan
Yankee Doodle in Berlin
Yasmin
The Year Dolly Parton Was My Mom

Fig. 5D

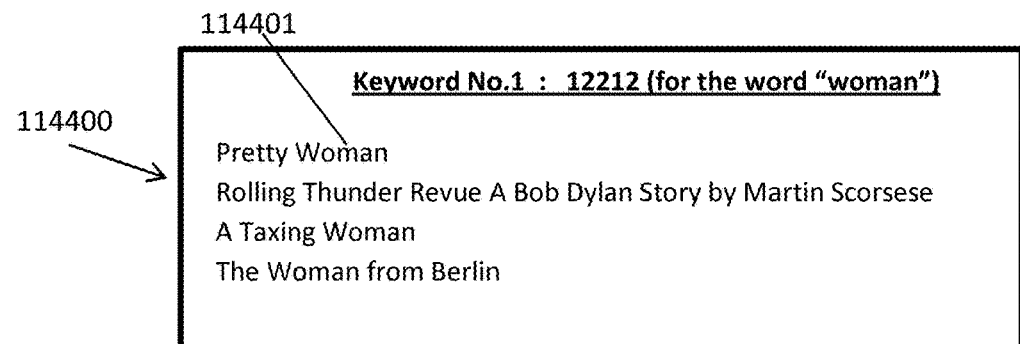

114401

Keyword No.1 : 12212 (for the word "woman")

114400
Pretty Woman
Rolling Thunder Revue A Bob Dylan Story by Martin Scorsese
A Taxing Woman
The Woman from Berlin

Fig. 5E

115201          115000          115202
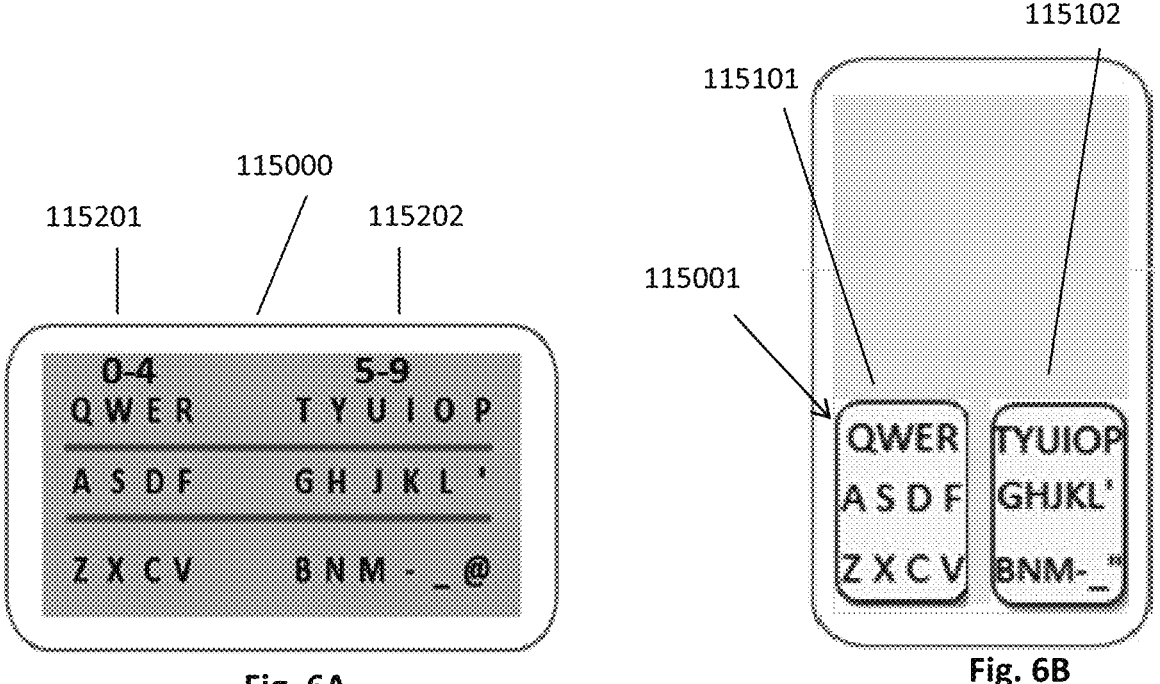
Fig. 6A
115101          115102
115001
Fig. 6B
116001          116002
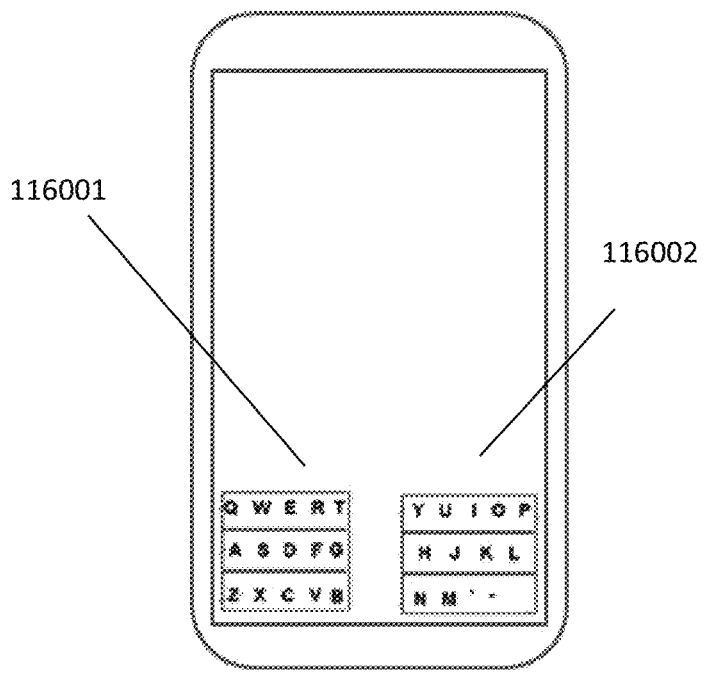
Fig. 7

SEARCH SYSTEM

The present application claims priority from U.S. provisional patent application No. 63/319,126 filed on Mar. 11, 2022, U.S. provisional patent application No. 63/319,336 filed on Mar. 13, 2022, and U.S. provisional patent application No. 63/321,720 filed on Mar. 20, 2022.

FIELD OF THE INVENTION

The present invention relates to data input systems and particularly systems and methods for entering letters, words, other symbols and/or other information by using few keys. The present invention further relates to a search system for searching textual contents within a database and/or a (e.g., one or more) corpus of textual contents. A textual content may be of any kind such as a word, a number, a phrase, a paragraph, a text (e.g., an article), etc. A textual content may be include one or more characters such as: letters, digits, punctuation characters, images/symbols (e.g. emoticons), etc.

For simplicity and clarity of illustration, reference numerals may be repeated among the figures to indicate corresponding or analogous elements. Also, similarly named elements perform similar functions and are similarly designed, unless specified otherwise. Numerous details are set forth to provide an understanding of the embodiments described herein. The embodiments may be practiced without these details. In other instances, well-known methods, procedures, and components have not been described in detail to avoid obscuring the example embodiments described herein. The description is not to be considered as limited to the scope of the example embodiments described herein.

BACKGROUND OF THE INVENTION

Mobile devices including cellular phones, personal digital aids and miniature computers are widely used as they are easily carried around and can perform many tasks. One problem of mobile device(s) is text entry, which is problematic because of the small size of a device. One solution for text entry in mobile devices is using a limited key set in which at least some of the keys are ambiguously associated with a plurality of letters. Upon receiving a sequence of key interactions (e.g. providing a sequence of input signals, which herein be referred to as 'input information') corresponding/relating to a desired word, a word predictive system may predict/propose one or more words from a dictionary/database of words. A word (e.g. with highest priority) may be presented by the system and may be entered by providing a predefined interaction such as pressing the space key. Such a word may herein be referred to as 'current word'). The problem of such system is that when a word is not in the database the user must use another method of text entry.

Another problem of mobile devices is how to enter easily symbols other than letters.

SUMMARY OF THE INVENTION

The data entry system, described in this application, provides a system that is adapted to mobile environments. It is also intuitive, accurate, fast, and easy to understand and use.

An aspect of the inventions relates to an input interface (e.g. herein may be referred to as a keyboard) having a plurality of input means and a processor adapted to relate an input signal received by/through an interaction with an input means to an unambiguous character (e.g. herein such an input signal may be referred to as unambiguous/identified input signal, and such a character may be referred to as identified/precise character) and/or to ambiguously relate said interaction to any character of a group of characters assigned to an/said input means (e.g. herein such an input signal may be referred to as ambiguous input signal, and such a character may be referred to as ambiguous character). Preferably, said input signals are together associated with all of the letters of a language such as the Latin/Roman alphabet or a phonetic alphabet.

Optionally, and interaction with an input means is related to an identified characters. Optionally an interaction with an input is ambiguously related to any character of a group of characters assigned to said input means and/or to an identified character (e.g. such an input means may herein be referred to as an ambiguous key or a (ambiguous) zone).

An aspect of some embodiments of the invention relates to an input interface (e.g. hereafter may be referred to as keypad/keyboard) having few, (e.g., such as at least 2) input means wherein interacting with any of at least some of said few input means is related by a processor to any of a plurality of characters assigned to said input means. Optionally, at least some of said input means are hard/physical keys. Preferably, said input means are touch sensitive keys such as on-screen keys. Optionally, said input means are predefined input means. Optionally, at least some of said input means are dynamically defined upon interacting with a location of the input interface. Such an input means may herein be referred to as a dynamic zone/key. Optionally, the assignment of a group of characters to a dynamic zone may vary based on some parameters such as where and/or how said interaction is provided. Preferably, said input means together represent at least all of the letters of an alphabet.

An aspect of some embodiments of the invention relates to an input interface adapted to identify user interactions with the input interface and to associate at least some of the user interactions with different types of input signals.

An aspect of the invention relates to a word predictive data entry system using a keyboard having a number of keys/zones (e.g., herein may be referred to as large zones) to each a number of letters and/or special characters (e.g., such as digits, punctuation mark characters, symbols (e.g., emoticons), etc.) are assigned. Preferably, each of the large zones has a number of small zones wherein at least one, preferably each, of the small zones/keys includes/represents some of the letters of a corresponding large zone. Preferably, said keyboard is a traditional keyboard (e.g., QWERTY, AZERTY, QWERTZ, etc.). Preferably, the small zones are linear (e.g. preferably horizontal) zones wherein at least one (e.g. preferably each) small zone having at least some of the letters of a corresponding row of letters of the keyboard. The keyboard may have soft/virtual keys and/or physical/hard keys. Preferably, the keyboard has two large zones each including three small zones. Preferably, the keyboard is a virtual (e.g. on-screen) keyboard. Optionally, the keyboard has physical keys. Optionally, the keyboard has a combination of virtual/soft and physical/hard keys.

An aspect of the invention relates to some embodiments regarding a word prediction system/data entry system that uses a keyboard having a few large zones, together including at least all the letters/characters (e.g. alphabetic, phonetic, etc.) of a language. Preferably, each large zone includes a number of small zones, each small zone having a portion of the characters of its corresponding large zone. Preferably, said small zones are linear zone, preferably horizontal zone, wherein at least some them having/representing at least a plurality of the letters of a row of letters of the keyboard. Preferably, the/a word prediction system predicts words by considering users interactions with large and/or small zones.

Various methods of prediction based on the principles of interaction with large and/or small zones are considered. Optionally, factors/principles such as a word's frequency of use, words that their (e.g. corresponding) characters best match interactions with large zones, words that their (e.g. corresponding) characters best match interactions with small zones, words that at least some of their characters are entered precisely, etc. are considered to predict one or more words. In a preferred method, the system may preferably consider words that all of their characters match the large zone interactions.

An aspect of the invention relates to dividing all of the letters of a keyboard into a number of (e.g. preferably two) large zones. Optionally, each of said large zones has a number of (e.g. preferably three) small zones. According to one aspect, an interaction with a small zone may ambiguously be related by a processor to any of the characters assigned to said small zone and/or it may ambiguously be related to any of the characters of the corresponding large zone. For ease of description, herein, such a large zone may be referred to as "broadly ambiguous zone/key" and such a small zone may be referred to as "narrowly ambiguous zone/key" or vise versa. Note that the word "letter" used in this patent application may also be considered as/related to a special character.

Preferably, upon receiving a sequence of interactions with the zones, the system may first choose a number of words of a database that correspond to said interactions in/with the large zone. This filtering method may dramatically reduce the number of possible choices corresponding to said interactions. Among the chosen words the system preferably select one or more words based on said (e.g., the corresponding) interactions with the small zones. Different, methods of selecting such words are described throughout this application.

An aspect of some embodiments of the invention relates to a procedure of auto correction, assisting a user to correctly enter a word upon mistyping a few (e.g. one or more) of its characters. For such purpose (e.g. upon meeting one or more conditions) within a received sequence of interactions with the keys/zones of the keyboard, the processor may relate an (e.g. one or more) interaction with a zone/key to a character of another zone/key.

An aspect of the invention is related to a virtual keyboard having two large zones being split and positioned on opposite sides on a touch sensitive surface.

Preferably, the input interface is used with a word prediction system/software wherein upon/during receiving a sequence of one or more interactions with the input interface (e.g. the input information), the system predicts one or more words from the corresponding entries of a database of words used by the system.

Preferably, each/some of the small zones has a plurality of letters. Preferably, at least one of the small zones includes also at least one special character. Preferably, upon an interaction with such a zone, the system ambiguously relates said interaction to said plurality of letters and said at least one special character too.

Optionally, a (same) single letter may be assigned to more than one (e.g. small) zone/key.

Optionally, an interaction with a large zone is related by the word predictive system to ambiguously corresponding to one/any of the letters of said large zone, In rare cases, an interaction with a large zone is related by the word predictive system to ambiguously corresponding to one/any of the letters of an adjacent large zone. Optionally, the system gives priority to the letters that are near (e.g. around/adjacent) the interaction impact over other letters of the interacted zone that are not near (e.g. that are far from) the interaction impact. Optionally, upon a meeting a condition such as if there are not enough words for the input information received by the system, the system may relate each of a number of (e.g. few, 1, 2, 3, or a percentage of) interactions to another character of the keyboard.

According to a preferred aspect, when the word predictive system receives a input signals corresponding to a sequence of key interactions, in addition to presenting one or more words ambiguously predicted (e.g. by relating at least one of the interactions to an ambiguous character), the system may also present the chain of identified characters (e.g. word) corresponding to the letters/characters with which the user interacts (e.g. letters at/under the user's tapping impacts).

An aspect of the inventions is related to a traditional keyboard having a number of horizontal rows of letters and/or special characters, wherein the letters and/or special characters are divided into few groups (e.g. 2) each group assigned to/represented by a different large zone.

Optionally, the input interface/keyboard has an alphabetical layout. Optionally, the keyboard has a traditional letter layout (e.g. QWERTY, QWERTZ, AZERTY). Preferably, (e.g. minor) modification to the layout may be provided. Preferably, a portion of the surface of a zone is assigned to an identified character. Preferably, interacting with a/said portion of a zone is related by the system to said identified character and/or ambiguously to any of the letters and/or special characters assigned to said zone. Preferably, the background (e.g. color, shade, etc.) of a zone is different than the background of its adjacent zone.

Preferably, special characters are divided into a plurality of groups (e.g. two groups) based on a common characteristic.

An aspect of some embodiments of the invention relates to an input system wherein a first (predefined) type of interaction with an input means ambiguously correspond to a first group of characters assigned to said input means, and wherein a second (predefined) type of interaction with the/said input means ambiguously correspond to a second group of characters assigned to said input means.

An aspect of some embodiments of the invention relates to a first type of interactions (e.g. gliding/swiping actions) provided on a touch sensitive surface to emulate a second type of interactions (e.g. tapping actions) with the keys of a virtual keypad/keyboard.

An aspect of the invention relates to a keyboard having a minimized size. The keyboard may have a few number of function and/or special characters keys.

An aspect of the invention relates to predicting words by considering matching values. A matching value is generally calculated to define how close a sequence of interactions provided by a user is to the characters of a word of the database on a keyboard. Other methods of calculation may be considered by people skilled in the art.

An aspect of the invention relates to some embodiments regarding a word prediction system/data entry system that uses any of the keyboards of the invention and the principles of predicting words described herein to predict words.

BRIEF DESCRIPTION OF THE DRAWINGS

Exemplary non-limiting embodiments of the invention will be described with reference to the following description of embodiments in conjunction with the figures. Identical structures, elements or parts which appear in more than one figure are preferably labeled with a same or similar number in all the figures in which they appear, in which:

FIGS. 2A-2G show keyboards and a table used to describe different word predictive methods in accordance with different exemplary embodiments of the invention;

FIG. 3 shows a portion of an exemplary database of contents and a method of using a word predictive software and keyboard of the invention for searching contents, in accordance with different exemplary embodiments of the invention;

FIGS. 5A-5F show exemplary remote control devices of the invention used with the searching system of the invention for searching contents, in accordance with different exemplary embodiments of the invention;

FIGS. 6A-6B show different exemplary remote control devices of the invention used with the searching system of the invention for searching contents, in accordance with different exemplary embodiments of the invention;

FIG. 7 shows an exemplary keyboard of the invention implemented within a smartphone and used with the searching system of the invention for searching contents, in accordance with different exemplary embodiments of the invention;

DETAILED DESCRIPTION OF EMBODIMENTS

Figure 1A:
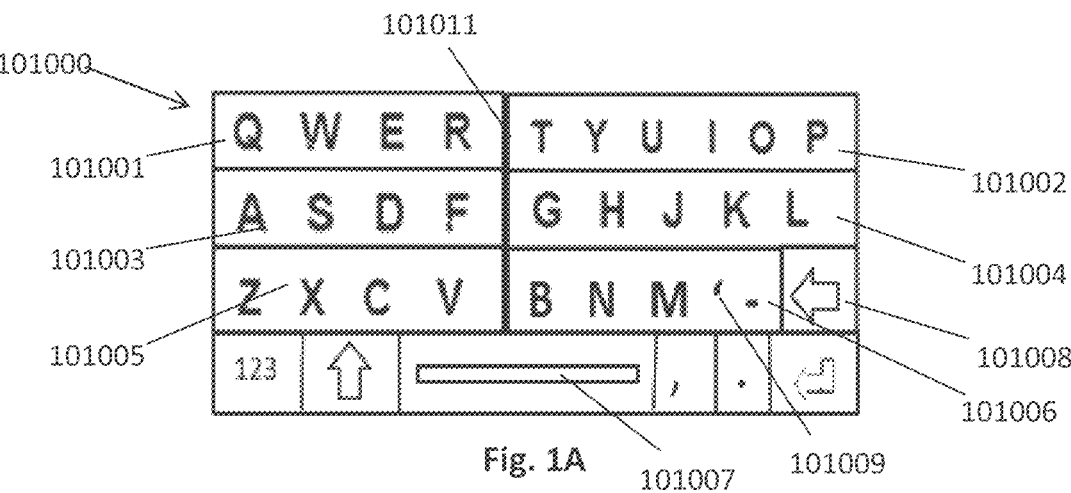
FIGS. 1A-1C show different keyboards of the invention wherein the letters are divided into two large zones in accordance with different exemplary embodiments of the invention.

FIG. 1A shows, as an example, a keyboard 101000 wherein the letter(s) are represented by six (e.g. horizontal) zones/keys 101001-101006, and wherein each of said zones represents a few characters/letters. Note that in this example assignment of the letters to the small zones is defined/ designed in a manner to augment the accuracy of a/the word prediction system using said zones. The principles of such word prediction system is commonly known (e.g. T9, etc.). Upon interaction(s) (e.g. tapping action(s)) with the one or more said keys/zones, the system may predict a (e.g. one or more) word/s from the database and preferably propose it/them to a user. In this example, the keyboard includes more keys, including a Space key 101007 and a Backspace key 101008. Preferably the zones are separated from each other such that to be easily distinguished from each other. In case of a virtual (e.g. on screen, on a touchpad) keyboard the border between the keys may be marked by separating delimiters (e.g. lines (e.g. 101011) and/or gaps). Said keyboard may be of any kind such as a physical keyboard, a virtual keyboard located on a touch sensitive surface (e.g. an on-screen keyboard), etc.

Figure 1B:
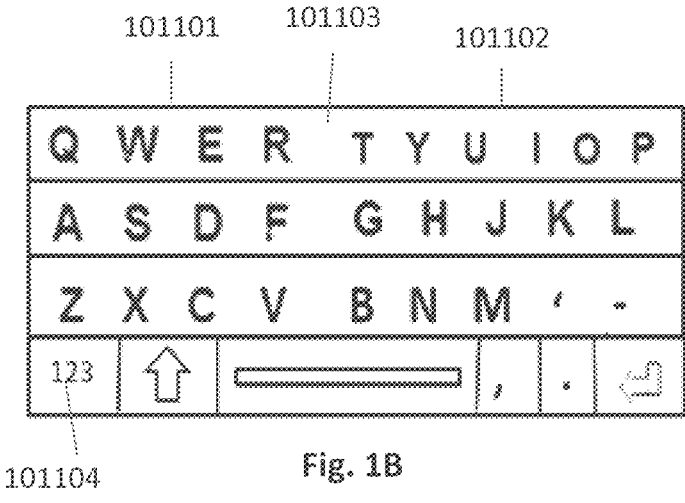

The letters of a keyboard may be divided into any number of zones/keys. As an example, FIGS. 1A-1B show the letters of a keyboard divided into six groups and represented by six zones/keys 101001-101006 each having a plurality of the letters. The division of the letters into said zones is provided such that to extremely enhance the accuracy of the word prediction system using said keys/zones. For example, the letters R and T are assigned to different keys/zones. The same may be regarding the letters F and G, and/or to the letters C and V which are also assigned to different keys/ zones. Note that in the examples of FIGS. 1A to 1C, the letters O and L are swapped for still more accuracy of prediction. Note that some groups of letters assigned to a zone may also include one or more special characters (e.g. apostrophe).

Note that preferably the zones of at least one side of a keyboard may have the same number of characters/letters. In the example of FIG. 1A, the left zones of the keyboard have each four letters. This may permit to have a split keyboard (e.g. explained herein) wherein at least one of the portions having a rectangular form factor.

According to one aspect, a dynamic division of a row of letters of a keyboard may preferably dynamically be defined based on the location of an interaction impact on said row of letters. In this method, preferably, a horizontal zone including one or more letters from each side of the interaction impact (e.g. on and/or close to the impact) is dynamically defined.

Each of said zones may be considered as an ambiguous (e.g. small) key/zone. A word prediction system as described herein may be used to predict words upon receiving a sequence of input signals corresponding to a sequence of interactions with said zones. The letters may be divided in any manner, preferably, such that to augment the accuracy of the prediction.

When a zone is interacted, the system may relate the interaction to (e.g. both) an ambiguous input signal (e.g. corresponding to any letter of the group of letters assigned to the interacted zone) and/or to a unambiguous input signal preferably corresponding to an identified letter on or near which said interaction is provided.

According to one embodiment of the invention, when a location on a zone is interacted by a user, the system may first consider the characters within said zone on which the interaction impact is provided, to predict a word. Preferably, the priority for consideration may be given to the characters based on their distance from said impact (e.g. respectively from the closest to the farthest). According to one method, in addition (e.g. preferably considering with less priority) the system may also consider the characters (e.g. close to said impact) from a neighboring zone (e.g. horizontally and/or vertically (e.g. preferably by giving higher priority to the characters from the horizontal neighboring zone)) relative to the interacted zone and/or (e.g. preferably considering with still less priority) from other zones.

According to one method, the system relates an interaction with a zone to any of the characters of said zone and to the characters that are near (e.g. around) the interaction impact from neighboring one or more zones.

Note that, according to one aspect, (e.g. in case of a horizontal (e.g. small) zone), a character of an interacted zone may be farther than a character of another zone relating to said interaction impact (e.g. preferably said another character not being adjacent to/around the interaction impact), wherein the system preferably gives priority to said character from said interacted zone over said another character from said another zone. According to another aspect, the system may preferably give priority to said letter from said interacted zone and not to another character from another zone even if said character from said another zone is adjacent/around the interaction impact.

Note that the small zones may have any shape, (e.g. horizontal shape including characters of a row of keyboard, square/rectangular shape including characters of two or more rows of a keyboard, (e.g. dynamically defined) circular shape including the characters around an interaction impact with the keyboard, (e.g. dynamically defined) special shape including the characters near and/or far from said interaction impact of a row of letters on which an impact is provided and a number of characters around said interaction impact from one or more other rows of letters of the keyboard, etc.

Based on the principles described herein, upon providing the input information corresponding to entering a word, different methods of presentation of the corresponding words may be considered such as:

a) according to one method, the priority (e.g. of presentation) may be given to the word based on some criteria such as for example to the word having the highest frequency of use among other corresponding words. Said word will be preferably entered (e.g. in the corresponding text field) upon a providing predefined interaction such as pressing the space key. The other words may be presented in a word list to be selected by a user if needed. b) according to one method, the priority (e.g. of presentation) may be given to the word having the highest frequency of use among other corresponding words that all of their letters correspond to the interacted (e.g. horizontal) zones. The other words may be presented in a word list to be selected by a user if needed.

A zone of a keyboard may include one or more special characters following the same rules of a letter (e.g. considered ambiguous and/or unambiguous). For example, an apostrophe (e.g. 101009) may be assigned to one of the zones (e.g. 101006).

Note that, the word to which a highest priority is given by the system may herein be referred to as current predicted word, or simply current word.

FIG. 1B shows a QWERTY keyboard divided into two large zones together including six small zones 101001-101006. In this example, in order to keep the look of a traditional keyboard, instead of a the delimiter in form of a line, a gap 101103 between the between the left zones 101101 and right zones 1010102 is provided. Note that this is an example, any other preferably slight modification to the letter arrangements may be provided.

It must be noted that the division of virtual keyboards into small and/or large zones as shown herein are exemplary divisions. Other types of division of a virtual keyboard based on these principles may be considered.

Note that the principles of division of a virtual keyboard described herein may also be applied to the keyboards having hard/mechanical keys. In this case, interacting with a key within a zone, may precisely be related by a processor to interacted key (e.g. or a key near said key) and/or ambiguously correspond to any of the keys of the zone in which the interacted keys is located. The hard keys of a zone may have a different characteristics (e.g. different color) so that to be easily distinguishable from the keys of another zone.

Figure 1C:
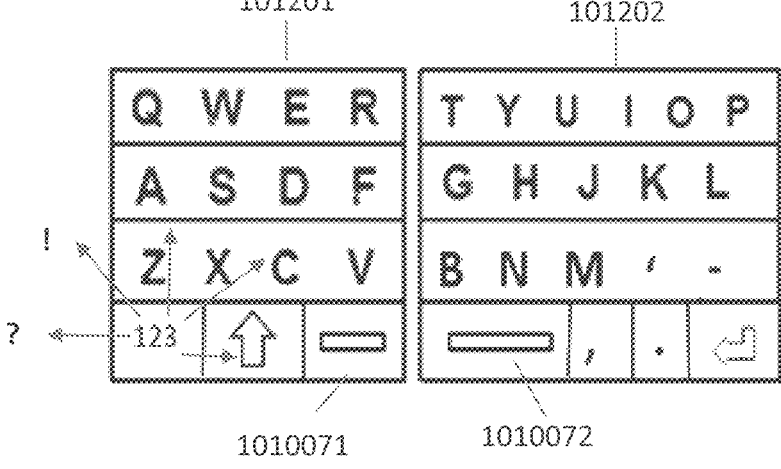

According to one embodiment, the keyboard may be split into two or more portions. Said portions may be attached to each other or they may have a (e.g. significant) gap between them. In the exemplary FIG. 1C shows a keyboard of the invention being split in two portions (e.g. large zones) 101201 and 101202 (e.g., in which respectively, the small zones/keys 101001, 101003, 101005, form a first column (e.g. vertical row) of letters, and the small zone/keys 101002, 101004, 101006 form a second column (e.g. vertical row) of letters).

The keyboard of the current embodiment has many advantages. As an example, the size of the keyboard may vary to touch screens with different size, from the smallest (e.g. a smartwatch), to the midst (e.g. a smartphone) and to the largest (e.g. Tablet) most probably without affecting the user's experience (e.g. speed, accuracy, easiness) with the keyboard.

In the example of FIG. 1A, in order to enter the word "why" the user may provide input information corresponding (e.g. ambiguous and/or precise input signals corresponding to entering a word by the (e.g. word predictive) system may herein be referred to as input information) to entering said word by for example interactions (e.g. pressing/tapping actions) on ambiguous key 101001, the zone 101004, and the key 101002. (e.g. by relating each of said interaction to any of the characters of the interacted small zones, the system may propose/predict the word "why" which corresponds to said key/zone interactions and has the highest priority among the words of the database corresponding to said interactions. If the predicted word is the desired word, the user may confirm it by providing an end-of-the-word signal such as tapping on the space key. As such, according to one method, in addition to entering the predicted word, the system may provide a space character after the entered word. Such a system to predict a word may herein be referred to as (e.g. fully) ambiguous/predictive system).

Preferably, the system may (e.g. simultaneously) propose more than one word corresponding to the input information provided by the user.

The input information corresponding to a current word may be related to an entire word or it may be related to a portion, preferably to the beginning portion, of a word. Accordingly, the system may look for words (e.g. in the entries of a database of words) that their entire characters correspond to the (combined) input information (e.g. herein may be referred to as short search or short word/s) or the words that a (e.g. preferably, beginning) portion of them correspond to the (combined) input information (e.g. herein may be referred to as long search or long word/s).

For better prediction results, in addition to the received input information (e.g. provided by key/zone interaction) corresponding to a word (e.g. 'school') being entered, the system may also consider one or more words (e.g. 'going to') preceding (e.g. already entered) the word being entered (e.g. herein may be referred to as prefix) in a text to predict the/a current word (e.g. being entered).

The arrangement of letters on few (e.g. two) keys/zones may be applied to some of the keys of a remote control (e.g. TV remote control, etc.). Preferably the letter keys are used with a word predictive systems for entering text as described herein. Additional characters such as special characters and some functions may be assigned to the remaining buttons of the number keys or other numbers of the remote control.

The manner of division of the letters into six zones may differ according to the corresponding language to improve the accuracy of the word predictive system. For example, by assigning the letters V and N to different zones/keys in a French (e.g. AZERTY) keyboard, the common words such VOUS and NOUS will correspond to different input information (e.g. different sequences of key interaction).

The data entry system of the invention may be used with any type of language such as alphabetical language, phonetic based language, etc.

The data entry system of the invention may be used with a numeric keypad.

As mentioned before, the location of the letters on the keyboard of the invention may preferably be similar to a standard (e.g. QWERTY) keyboard and/or with (e.g. slight) modification(s). For better accuracy of prediction, a character such as a letter may be relocated from a first zone to a second zone preferably to a neighboring zone. Preferably, the new location of said character/letter in a (neighboring) zone may be very close to said character's/letter's original location. Preferably, the relocated character is a vowel letter such that the main vowels (e.g. A, E, I, O) are assigned to different (e.g. small) zones.

Note that the letter portion (e.g., a large zone) of the keyboard may also include a function and/or a special character key.

According to one embodiment, when a user interacts (e.g. taps) on a first (e.g. horizontal) zone, in addition to the characters ambiguously assigned to said zone, the system may also (e.g. first) consider at least one (e.g. preferably the first) character from a/the neighboring zone (e.g. preferably from the same horizontal row of zones) preferably near the corresponding user's (e.g. finger) interaction impact provided on said first zone. For example, by considering the keyboard of FIG. 1A, if a user interacts (e.g. taps) on zone 101002 on a location near the zone 101001, in addition to ambiguously considering the letters assigned to the zone 101002 the system also considers at least one of the nearest characters (e.g. 'R') from the zone 101001. Note that the system may also consider (e.g. ambiguously) (e.g. additional) character's (e.g. any of the characters 'G, F, H") from the vertical row of zone/s (e.g. preferably at first from the adjacent zone (e.g. in this example, the zones 101003 and 101004), and the system (e.g. with less priority) may consider (e.g. ambiguously) (e.g. additional) character's from any other zone of the keyboard.

Note that as mentioned, according to one embodiment when the user interacts with a (e.g. preferably linear, such as a horizontal) zone, the system may preferably first consider the characters near (e.g. on and/or on left and/or right side of) the user's finger impact of an interaction (e.g. a tapping action) provided anywhere on a row of zones regardless of the zone on which said tapping action is provided. (e.g. If needed) The system may (e.g. also) consider (e.g. additional) character/s preferably respectively from the zone on which the interaction (e.g. tapping action) is provided, the other horizontal zones, the other zones of the same side of the keyboard on which the interaction (e.g. tapping action) is provided and (e.g. finally) from other zones. In this embodiment, preferably at least a number of zones, optionally all of the (e.g. small) zones, are linear zones such as horizontal zones.

In order to augment the accuracy of the system also permitting sloppy typing or some mistyping (e.g. typing on a wrong zone), the system may consider that a keyboard used by the system has one or more broadly ambiguous zones (herein, may be referred to as large zone/s) and one or more narrowly ambiguous zones (e.g. for/within each of the broadly ambiguous zones) (e.g. herein may be referred to as small zone/s). According to a preferred embodiment, the keyboard of the system may be considered to, preferably, have two broadly ambiguous zones each, preferably, having three narrowly ambiguous (e.g. preferably, horizontal) zones. As an example, FIG. 2A shows the keyboard of the invention having six small zones 104001 to 104006 (e.g. herein, may be referred to as to the (small) zones 1 to 6) each, preferably, having a few letters. Each of said zones may be considered as a narrowly ambiguous zone. The keyboard may also be considered to be divided into two broadly ambiguous zones 104011 and 104012 (e.g. respectively, herein may be referred to as to large zones interaction values 1 and 2) each having a larger (e.g. more letters than are on a small zone) number of letters. Note that the left broadly ambiguous zone 104011 preferably ambiguously includes (e.g. preferably at least) the letters of the left narrowly ambiguous zones 104001, 104003, 104005 (e.g. herein may be referred to as the left column of the small zones), and the right broadly ambiguous zone 104012 preferably ambiguously includes the (e.g. preferably at least) letters of the right narrowly ambiguous zones 104002, 104004, 104006 (e.g. herein may be referred to as the right column of the small zones). To simplify the description, a broadly ambiguous zone may herein be referred to as a large zone, and a narrowly ambiguous zone may herein be referred to as a small zone).

Note that according to one aspect, the left and/or right large zones described herein, may be designed to be arranged as upper and/or lower large zones (e.g. arranged vertically). Accordingly, the left and/or right small zones may be designed to be arranged horizontally, or other arrangement such as diagonally.

A user typing a word generally types on the small zones corresponding to the letters of the word. It may happen that the user does not type on a correct small zone corresponding to a letter because for example he may type fast or sloppy (e.g. he/she may type by mistake on a vertically neighboring small zone) (e.g. herein may be referred to as mistyping), but most probably he/she may generally type on a/the correct large zone corresponding to said letter (e.g. or small zone).

Note that typing on a keyboard having two ambiguous large zones is generally error-free typing because the zones are large. On the other hand, while typing accurately on large zones, a user typing a word may erroneously type on wrong small zones within the corresponding large zones.

By considering these principles, when a user types a word, the system may (e.g. simultaneously) consider, both, on/with which large zones and on/with which small zones the user interacts, to provide a highly accurate prediction (e.g. that may) also permitting some mistyping (e.g. on the small zones) (e.g. preferably, less mistyping for short words and more mistyping for long words).

As an example, FIG. 2B shows an exemplary portion 104100 of a database of words used by the system. In column 104104, a plurality of words are shown. In column 104102, for each of said words (as an example, the word "supports") the corresponding (e.g. required) (e.g. pressing) interactions with the small zones are shown in form of a sequence of digits (e.g. 42224123, corresponding to interacting with the small zones corresponding the word "supports"). Note that interaction with each of the small zones (e.g. see the small zones of FIG. 2A) is represented by its/the last digit of its reference number in the drawing (e.g. herein may be referred to as its small zone interaction value) in the corresponding sequence of digits. For example, the sequence of digits 42224123, represents interacting with the small zones 104004, 104002, 104002, 104002, 104004, 104001, 104002, and 104003.

Note that, each of said words also corresponds to interacting with a same sequence of interactions with the large zones of the keyboard as shown in column 104101. In this example, the sequence of key interactions with the large zones corresponding to said words are demonstrated by the sequence of digits (e.g. large zone interaction values) 12222121 wherein each digit of said sequence of digits represents the last digit of the corresponding large zone of the keyboard of the exemplary keyboard of FIG. 2A. Column 104103 represents the frequency of use/priority of the corresponding words of column 104104.

According to a preferred method, after interacting with small zones corresponding to (e.g. entering) a word, the system may first relate said interactions to the corresponding large zones and select/consider the corresponding words of a corresponding database of words. The system may preferably sort/consider the order of said words based on the precision (e.g. degree of correct typing) of the corresponding small zones interacted by the user for the entry of a desired word (herein may be referred to as best match degree/value). For this, the system may preferably compare the small zones interactions (e.g. provided by the user) with each of the sequence of interactions with the small zones corresponding/required for the entry of a corresponding word as shown in column 104102. If more than one word has the same number of precise/correct interactions with the small zones, then preferably the system first proposes/considers the word with highest frequency of use among said more than one words.

In the current example, as an example, in order to enter the word "support", if the user types sloppily and instead of providing the sequence of small zone interaction 32224123 the user by mistake (e.g. 2 mispresses) provides the small zone interaction 32222121, the words with lowest number of mistaken small zone interactions among the zones corresponding to the large zone interactions 12222121 are the words "supports" and "simulate". The word "supports" has higher priority than the word "simulate" in a 1-gram database of words, therefore it may be presented as a first choice (e.g. the current predicted word). Note that if the system uses linguistic rules, (e.g. by considering the prefix "we") in some cases, the word "simulate" may be presented (e.g. "we simulate") as the current predicted word. For example, there may be no 2-gram entry for "we supports" or it may have a lower frequency of use).

Note, that according to a preferred method of proposing/predicting words, the system preferably proposes words from entries in a corresponding word database in the order from the greatest number of grams to the least number of grams corresponding to the input information.

The principle of proposing/predicting words just described may be applied to any of the inventions described in this application.

Note that according to the principles described, the system may consider/accept mistyping on small zones in a large zone but preferably/generally does not consider mistyping on large zones (e.g. unless no word or a very few corresponding words are found in the database).

Note that the system may also consider longer words such that their beginning portion (e.g. 1 to N beginning letters) corresponds to the large zones interactions provided by the user. Preferably, the system also considers such words when there is no or when there are a few number of words corresponding to the small zones interactions provided by a user (e.g. with a maximum permitted number of mistyping). As an example, as shown as an example in the table below,

| | | | |
|---|---|---|---|
| 221111212 | 263113236 | 1552 | understand |
| 221111212 | 263311232 | 233 | inadequate | the large zone interactions 2211112121 corresponds only to two words in a/the database used by the system. The system may also consider one or more longer words beginning with said large zone (e.g. and best match small zones) interactions (e.g. 'understanding', 'inadequately', etc.).

Note that in some cases, the system may include only one word corresponding to a sequence of large key/zone interactions. This means that in some cases the user can type anywhere on the corresponding large zones and get his/her desired word.

Note that preferably, the system may also consider that the user has/may mistakenly pressed an (e.g. one or more)

extra/additional zone interactions (e.g. the number of interaction with zones is greater than the number of characters of a word) during the entry of a word and therefore the system may propose one or more corresponding words by not considering a number (e.g. 1 to 2) of the zone interactions within a sequence of a zone interactions. On the other hand, the system may consider that the user may have omitted one or more zone interactions and therefore may propose longer words that include and/or correspond to the zones interactions provided by the user (e.g. also by considering mistyping errors).

Note that according to one method, the system may first select a number of words of a database that correspond to a sequence of large zone interaction, and among said selected words the system selects the words that best match with the corresponding small zones being interacted. According to another method, the system may first select the words that best match the interacted small zones, and preferably in some cases (e.g. when/where there are not enough corresponding words), the system may look for other words that correspond to the interacted large zones (e.g. by relating one or more of said interactions to interacting with a large zone other than the corresponding interacted large zone).

Note that according to one aspect, a word having a character corresponding to a small zone not neighboring an interacted small zone of a large zone may either not be considered by the system or may be given less priority (e.g. on the fly/dynamically). As an example, in the example of FIG. 2C, if a user interacts with the small zone 104001, the system may not consider the words that in the corresponding letter position have one of the letters of the not neighboring zone 104005 (e.g. the system my consider only the letters that are in the small zones 104001 and 104003 (shown by circle 1040111)). Or vise versa.

According to one aspect, in addition to the large zones and small zones consideration, the system may also consider the letter on/near which an interaction with a zone is provide (e.g. as a precise letter/character). The examples/principles of entry of precise characters (e.g. during the entry of an ambiguous word) have already been described in detail.

Note that according to a preferred method, each time a user interacts with an ambiguous letter zone, the system may (e.g. preferably simultaneously) relate said interaction to, both, the corresponding large ambiguous zone and the corresponding small ambiguous zone. Preferably, the corresponding word database used by the system is arranged (e.g. as shown in FIG. 2B) such that to relate each word (e.g. of an entry) to its corresponding large zones interactions and small zones interactions, also preferably including the priority of each/said word. According to one aspect, the keyboard may have a number of left large zones (e.g. 1040111 and 1040112 of FIG. 2C) and a number of right large zones (e.g. 1040113 and 1040114). Note that preferably in such case, according to one aspect, a small zone (e.g. 104003) may be included in two corresponding large zones.

Note that the keyboard, the large zones, the small zones, the arrangement of letters, the location of small and/or large zones, etc. are shown as examples to describe the principles to enhance the accuracy of the system based on/by considering a human/familiar way of interaction with a/the keyboard (e.g. of the invention). Any other type of keyboard, any number of large zones, any number of small zones, any key/zone and/or letter configuration, etc. may be considered for such purpose and/or based on principles described herein. According to one aspect, all of the words corresponding to a sequence of large zones interactions may be presented/considered by the system. According to another aspect, (e.g. among said words) some (e.g. at most a predefined number) of the words that best match interactions with the small zones (e.g. having least mistyping on small zones) may be presented/considered by the system. According to another method, words with lesser match (e.g. with the small zones) but having higher (e.g. very high) frequency of use may be given higher priority for/of presentation over the words having better/greater match (e.g. with the small zones) but having lower (e.g. very low) frequency of use, or vise versa.

As mentioned before, the system may have a number of (e.g. two) large zones wherein each of the large zones may have/include a number of small zones. According to one aspect said small zones may be/are (e.g. dynamically) defined, preferably, based on location on which the/a user interacts within a large zone. According to one method, a small zone is (e.g. dynamically) defined around and/or near the user's interaction impact with a large zone. Preferably, the small zone defined as such includes the corresponding (e.g. some) characters from the interacted large zone (e.g. only). As an example, FIG. 2D shows a keyboard of the invention having two large zones 104011 and 104012. In this example, the key/zone interaction 104111 is ambiguously related by the system to any of the neighboring characters (e.g. YUIHJK) to/of the interaction impact 104111 with the large zone 104012. Also in this example, the key/zone interaction 104112 is ambiguously related by the system to any of the neighboring characters (e.g. DFCV) to/of the interaction impact 104112 with the large zone 104011. Note that, preferably, the neighboring characters (e.g. BG) that do not belong to the interacted large zone 104011 might not considered by the system belong to another large zone). By considering the principles (e.g. of (e.g. interacting with) large and small zones) described, in this example, the system may propose the word 'if' as an example.

FIG. 2E shows another example of entering a word. In this example, the key/zone interaction 104211 is ambiguously related by the system to any of the neighboring characters (e.g. YUIHJK) to/of the interaction impact 104211 with the large zone 104012. Also in this example, the key/zone interaction 104212 is ambiguously related by the system to any of the neighboring characters (e.g. ERDF) to/of the interaction impact 104212. Note that, preferably, the neighboring characters (e.g. TG) that do not belong to the interacted large zone 104011 are not considered by the system. By considering the principles described, in this example, the system may propose the word 'if' (e.g. and not the word 'it').

Note that according to a none preferred method, all characters around the impact may be considered by the system, even if some of them (e.g. respectively, BG and TG in the examples above) belong to a large zone other than an interacted large zone.

The current aspect wherein the small zones are those near/around (including under) the user's impact on a large zone may be beneficial for languages having many characters (e.g. Russian) and/or languages (e.g. Arabic, Hebrew) that generally exclude some characters such as vowels from the keyboard.

Note that any number of large zones (e.g. 1, 2, more) and any number of small zones within a large zone based on any concept may be considered by people skilled in the art.

Note that according to one aspect, in some cases (e.g. because of the high frequency of a corresponding word) the system may first consider a character from the characters of a (e.g. an interacted) large zone (e.g. preferably but not limited to or corresponding to the interacted impact) other than the characters of the small zone related to the interaction impact.

As mentioned before, the methods of text entry described in this application are mainly/preferably considering typing correctly on large zones by permitting sloppy typing within a large zone. It must be noted that in some cases such as when no word or not enough words are found in a corresponding database for the input information (e.g. typing actions corresponding to a word) provided by a user, the system may also consider that the user may have mistyped on (e.g. not pressed a (e.g. one or more) correct large zone) large zones and therefore may proceed to a correction procedure relating to mistyping on large zones (e.g. too). In this case, the system may consider that one or more of the interactions (e.g. typing/tapping actions) of/corresponding to the input information may have been provided on a wrong large zone and, preferably, relates one, and if needed more, of the interactions/s to a large zone other than the one with which the interaction is provided).

Other methods of may be considered for the purpose of describing a method of text input by interacting with preferably two (e.g. or more or less) large zones and predicting words with high accuracy.

According to one embodiment, during the entry of a word, after considering the user's interactions with the large zones (e.g. and selecting a number (e.g. one or more) of the corresponding words of a database of words used by the system), the system may also consider location of the/said user's interaction impacts on the large zone(s) to propose the (e.g. one or more words among the) best matched words (e.g. from a/the corresponding selection of words) by the system to the user. Accordingly, one aspect may consist of prioritizing one or more words (e.g. of said corresponding selection of words) based on measuring the distance between the impacts of said user's interactions on a (e.g. large) key/zone and each corresponding character of a word (e.g. each of at least a number of words of the selection) (e.g. presented/displayed on any corresponding large zone) of said selection of words for the corresponding user's impact (e.g. on the touch sensitive keyboard). For this purpose one or more methods of measurement may be considered (e.g. the method of prediction based on the distance as described herein may be referred to as semi-predictive system/mode) such as:

a) 'exact measurement': the distance (e.g. for each character of a word) is preferably measured based on physical (e.g. linear) distance between the location of a desired character to be interacted on the touch sensitive keyboard corresponding to a character of a word and the actual corresponding user's impact location (e.g. on said touch sensitive keyboard). Such a distance may herein be referred to as error distance. b) 'simplified measurement': the distance (e.g. for each character of a word) may be measured based on the number of characters between the location of a desired character to be interacted on the touch sensitive keyboard corresponding to a character of a word and the character closest to the user's impact location (e.g. on said touch sensitive keyboard). Such a distance may herein be referred to as error distance.

The methods of measuring described above may preferably be applied to each of the characters of a word of said selection of words. The total of distances for the characters of a word may be measured/calculated to provide a parameter that may herein be referred to as the total error distance (e.g. value).

According to a preferred method, the words of a selection of words may be presented/considered in an order from the lowest total error distance to the highest total error distance.

By considering the exemplary FIG. 2F, an example of the simplified measurement method is described herein. In this example, a virtual AZERTY keyboard is shown wherein a user has tapped twice 104311 and 104312 on the corresponding large zones respectively 104011 and 104012. In this example the impacts 104311 and 104312 of the user's interactions are provided respectively on the areas corresponding to the letter 'z' and 'h'. The error distance of all letters in the interacted row/small zones relating to the interacted impacts 104311 and 104312 within respectively the corresponding large zones 104011 and 104012 are shown in the respective tables 104411 and 104412.

Figure 2G:
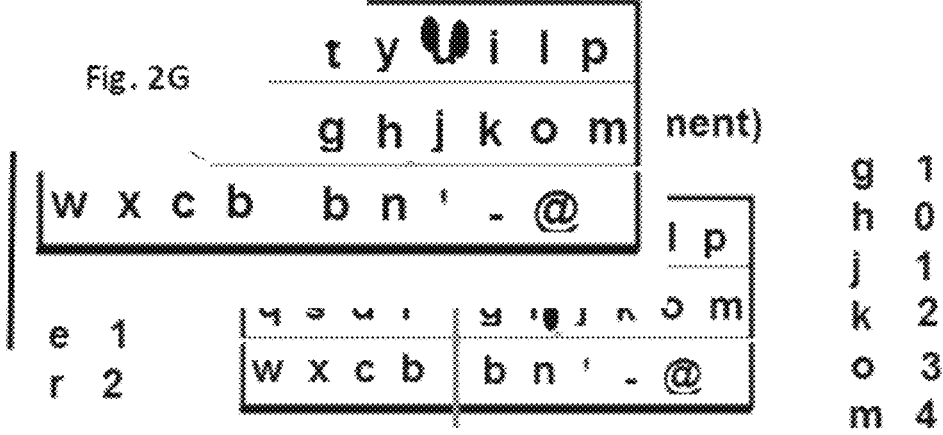

In the example of FIG. 2G, the user's two consecutive impacts 104511 and 104512 are shown on a keyboard. As an example, by considering the simplified measurement method described herein, the system may best correspond two words 'il' and 'tu' to said interactions. The word 'tu' may be presented as the word having the highest priority because its total error distance (=2) is less than the total error distance (=3) of the word Note that in this example, in addition to its distance value from the impact, a penalty value of n1 (e.g. 5) may be added to the total error distance preferably for each of the letters of the neighboring row 104004 and a penalty value of n2 (e.g. 10) may be added to the total error distance preferably for each of the letters of the none neighboring row 104006.

Upon receiving a sequence of interactions (e.g. herein may be referred to as impacts) with a keyboard corresponding to entering a word, based on the principles described herein and by considering different methods/principles of word presentation/prediction, the system may present/predict one or more words. Herein, some more exemplary methods/principles are described. Each of the methods may be used separately or in combination with any of the other methods. Optionally any of the methods may not be used. Upon receiving a sequence of interactions, any one or more of the following methods/principles may be considered/combined:

A plurality of words preferably with higher matching value than a predefined required minimum matching distance value (i.e., words with lower than a predefined or dynamically defined total error distance value) from one or more N-gram (e.g. 0<N<6) database/s of words may be considered by the system (e.g. herein may be referred to as a considered group of words).

After a current predictive word is selected, a number of other considered words based on some criteria may be presented (e.g. in a word list) to the user for selection if desired.

According to one method, if a sequence of interactions (e.g. tapping) impacts are provided on the characters/letters of a keyboard and wherein said letters/characters form a word of the database (e.g. preferably, in order of the interaction impacts) and preferably wherein said word has a higher frequency than a predefined fixed or dynamically defined value (e.g. related to a selected current word or based on some other criteria), then said word may be presented as the current predicted word. Preferably, this rule is applied to a word of a 1-gram database of words.

Note that according to one method, the interaction impacts may be related to short words (e.g. words with the corresponding number of characters (e.g. equal to number of impacts) and/or to (e.g. the beginning characters of) longer words. The system may use a word completion system to predict and/or present a longer word.

Note that a correction system used by the system may relates an (e.g. one or more) impact to a character from another large zone. Preferably such correction system may be used if no word or not enough word is found to correspond to the input information provided by the user.

Note that the phrases 'error distance' and 'distance error' used herein may preferably refer to same meaning.

Note that a dynamic small zone is defined in a (e.g. horizontal) row of letters on the side/s of an interaction impact, wherein said dynamic small zone includes a few (e.g. one, two, etc.) of characters near/next to the said impact from the corresponding side. Note that the number of assigned characters of each side of the impact may be different/vary.

Note that according to one method, the error distance within a small zone may be multiplied by a (e.g. one or more) first predefined number. A neighboring zone (of the corresponding large zone) may be multiplied by a second predefined number. And a zone which is not a neighboring zone may be multiplied by a $3.\sup.rd$ predefined number, etc.

Different other methods of predicting words may be considered such as:

a) When a user types (e.g. anywhere) on a large zone, according to one method, the system relates the input information corresponding to a word provided by the user (e.g. and related information such as, for example, letters pressed, large zone pressed, small zone pressed, distance between key presses, location of key presses, etc.) to a number of words of the database used by the system. Among the related words, the system may select one or more words that best match the user's interaction on small zones within the large zones for said input information (e.g. interacting with the large zones).

According to one method, the system may also consider the interaction impact locations within a small zone of said input information to prioritize the presentation of one or more words that best match said interaction impact locations within the small zones.

According to a preferred method, in order to give the user a great degree of freedom of typing sloppily while also permitting the user to enter words rarely used (e.g. a word that does not have the highest priority within the selected words) by typing with relatively high precision (e.g. relatively near and/or on desired characters as compared to undesired characters), a method of text entry is described herein:

According to one embodiment, if a word not having highest priority/frequency of use best matches (e.g. has the best matching value) the user's interactions impact locations (e.g. best matches based on the total error distance calculation) (e.g. note that a word may have one character only, therefore one impact location) within the small zones but said best match value is less than a predefined minimum match value/percentage, the system may preferably present a word having the highest priority among the words corresponding received input information as the current word. In this case said best matched word may be presented in a word list as an option (e.g. for a user to select). Said method may (e.g. or may not) be activated for a given predefined or dynamically defined minimum and/or maximum frequency of use values (e.g. word frequency), and/or upon some other condition.

Preferably, said/the required minimum match value may vary depending on the length of the word being entered (e.g. the number of characters of a word being entered is equal to the number of interacting impacts provided until then or the number of characters corresponding to a user's interaction). For example, for the words having 2, 3, and >3 characters, the required minimum matching value may respectively be 50%, 66% and 75%. As another example, depending on the number of characters corresponding to a word, the system may calculate (e.g. pre-calculated and/or dynamically on-the-fly) the required minimum matching value.

According to one method, the match value may be calculated based on the correct characters interacted during providing the input information corresponding to entering a desired word.

It must be noted that in the current embodiment, the words corresponding to user's interaction with the keyboard may preferably be considered from the same N-gram entries. The rules of predicting words from N-gram entries have also been described throughout this patent application.

According to one embodiment of the invention, the current (e.g. a first) word may be presented based on considering the user's interaction with a zone regardless of the impact of the user's interactions within said zone (e.g. based on the fully predictive system).

According to another embodiment, the current word may be a word related/based on the semi-predictive system, and at least one of the words of the wordlist may be predicted/presented based on the fully predictive system.

It must be noted that any other method for providing the features of this invention (e.g. different methods of calculation to decide if a sequence of typing action is provided harmoniously or not, different methods of word prediction, etc,) described herein based on the principles of the invention may be considered by people skilled in the art.

Usually a user typing (e.g. a long word) types with more precision the beginning and/or the ending characters of a word. By considering this fact, a method of auto-correction may be provided to correct mistyping or misspelling of a word (being) typed. According to one embodiment, when a word is being entered, the system may scan the words corresponding to the input information provided by the user (e.g. starting from the first character towards the last character, and/or starting from the last character towards the first character). The words that their beginning portion and/or the ending portion best match (e.g., are the closest to the corresponding user's interaction (e.g., tapping) impact) the corresponding input information provided by the user may be presented to the user. Note that the input information may include ambiguous input information (e.g. by tapping on ambiguous keys) and/or precise input information (e.g. by entering identified/precise character/s). Preferably, the length of the words being scanned are close to the number of characters corresponding to the input information provided by the user (e.g. same length, or shorter or larger words having for example less or more N characters wherein N is preferably 1 or 2). In the latter, preferably, the system gives priority to the letters of a horizontal row of keys.

Note that for better accuracy of prediction, words that are selected/presented are those that the rest of their characters best match the corresponding input information.

Note that a word being selected based on the input information (e.g., a sequence of key interactions) provided by a user is preferably selected based on a combination of parameters such as frequency of use, the best match interacted narrow and/or large zones, direction of taps on in a corresponding sequence of taps on the large zones described in this application, the corresponding word/s being from a 1-gram or being a (the last) word of a N-gram entry wherein N>1, etc.

As an example, for a word having a higher frequency of use may be given a higher priority over another word that has less frequency of use even if it (e.g. said another word) better matches the (e.g. narrow/large) zones being interacted by the user in the corresponding input information (or vise versa).

As mentioned before, the keyboard of the invention may also have hard keys version wherein each of the hard (e.g., physical) keys represent one of the zones on the on-screen keyboard of the invention. At least substantially all of the principles of the data entry system of the invention (e.g. (6) small zones, (2) large zones, correction of mistyping, etc.) may preferably be applied to the virtual/on-screen keyboards of the invention may be applied to corresponding hard keys version.

Note that the hard keys version of the system can be implemented and/or used with any type of device such as a pendent electronic device, a wrist mounted device, etc.

It must be noted that the hard/physical keys may be of any kind According to one aspect, said keys may have a touch sensitive surface so that gliding actions in different directions (e.g. to permit entering precise character and/or function as described for on-screen zone/keys).

Note that some special characters are usually used during the entry of a word or immediately after that. As an example, the symbol ";" is usually used at the end of a word.

According to one method, a gliding action provided from a letter zone towards up and end ending outside the letter zones/keyboard may be related to the "shift" function (e.g. capitalizing a corresponding character).

Note that the principle of the function keys described herein may be used with any type of keyboard having any type of key configuration The principles of the data entry system of the invention using two large keys/zones may have a variety of applications. As an example, accordingly, a searching system/application using the data entry system of the invention for searching contents may be created. As an example, but not limited to the example, the data entry system may be used for searching contents such as movies, songs, etc., on mobile and fixed devices. FIG. 3 shows as an example, portions 112001, 112002, and 112003, of a list 112000 of more than 44000 titles of movies as presented by/in the Wikipedia. Said list is used to provide examples in the current patent application, of finding and presenting titles based on the principles of the search system of the invention.

As described before, each of the two large zones/key may be represented by a unique (different) input signal (e.g. a digit). As an example, by considering the keyboard of FIG. 1C, interacting with (e.g., any of the letter keys of) the left large zone 101201 may produce (e.g., or related (e.g., by the system) to) the digit "1", and interacting with (e.g., any of the letter keys of) the right large zone 101202 may produce (e.g., or related (e.g., by the system) to) the digit "2". Note that instead of the digits 1 and 2, other methods/symbols may be used by the word predictive system of the invention. As an example, instead of the digits 1 and 2, digits 0 and 1 may be used for representing an interaction with respectively, the (e.g. large) key/zone 101201 and the (e.g. large) key/zone 101202 of the keyboard of FIG. 1C.

Accordingly, the words of a title database may be represented/arranged by said digits 1 and 2. For example, the word "hello", may also be represented by the sequence of digits "21222" and the word "world" by the sequence of digits "12121" (e.g., herein may be referred to as a "digitized word"). The length of a sequence of digits may have a direct impact on the accuracy of prediction of the corresponding word. A longer sequence of digits results in better prediction of the corresponding word. As such, the data entry system of the invention may be highly efficient for searching for a phrase (e.g. a movie title) among a database of phrases (e.g., among a database of movie titles) because a phrase is comprised of a plurality of words and searching for preferably two words or more words means searching according to two or more sequences of digits as described above.

Preferably, the search system of the invention uses database of textual contents (e.g., herein may be referred to as database of phrases/titles). A database of phrases/titles may be of any kind such as titles of songs, titles of videos, titles of movies, (e.g., driving) addresses, titles of (e.g., Internet/digitized) articles, map addresses, any other type of addresses (e.g., locations, URLs, etc.), (e.g. phone) numbers, a list/database of names, a list/database of contacts names (e.g., of a user's smartphone), a database of predefined (e.g. SMS) messages, etc. A database of phrases/titles may also include/be comprised of a combination of different kind of textual contents such as those mentioned above. As an example, a database of phrases/titles may include names and telephone numbers (e.g., such as a contacts database of a user's smartphone). For the reason of simplicity, a database of textual contents (e.g., phrases/titles) may herein be referred to as a database of "titles". Also for the simplicity reason, the term "textual content" may/is herein be referred to as "title".

By using the word predictive system/software of the invention and searching for any two or more (e.g., digitized) words (e.g., based-on/corresponding-to the entry of a sequence of digitized words corresponding to a sequence of interactions with the corresponding large keys (e.g. herein may be referred to as "keyword/s")) of a phrase within a database of phrases (e.g., by searching for any two or more (words of a movie title during a single search), the chances that the word predictive system of the invention correctly predicts and/or presents the desired phrase (e.g., movie title) becomes/is extremely high.

Note that, even if a title within a database may have only one word, because generally most of the databases (e.g., especially those stored and/or used in a mobile device) have at most a few thousand of titles, the search system of the invention may/is-adapted-to find a desired title and will present the title substantially among the top of a list of selected titles to a user.

Note that the word "phrase" used herein may preferably means a sequence of words of any kind such as text, and/or a sequence of group-of-symbols (e.g., digits, special characters, etc.), group of functions, and/or a mixture/combination of at least two of them, etc.

According to one embodiment of the invention, based on the principles of the data entry systems of the invention described herein, a software/application/system for searching phrases among a database of phrases may be created. For the purpose of describing such/said search system/application/software, said phrase may herein be described as a "title" (e.g., of a movie).

Based on the principles described above, only two (e.g., large) keys may be enough for searching for (e.g., textual) contents (e.g., phrases, titles, etc.) within a (e.g., appropriate) database. Accordingly, different devices and/or interfaces having two (e.g., large) keys (e.g., to which at least the letters of an alphabet divided in two groups are assigned) may be designed and/or produced for searching titles within databases.

Figure 4:
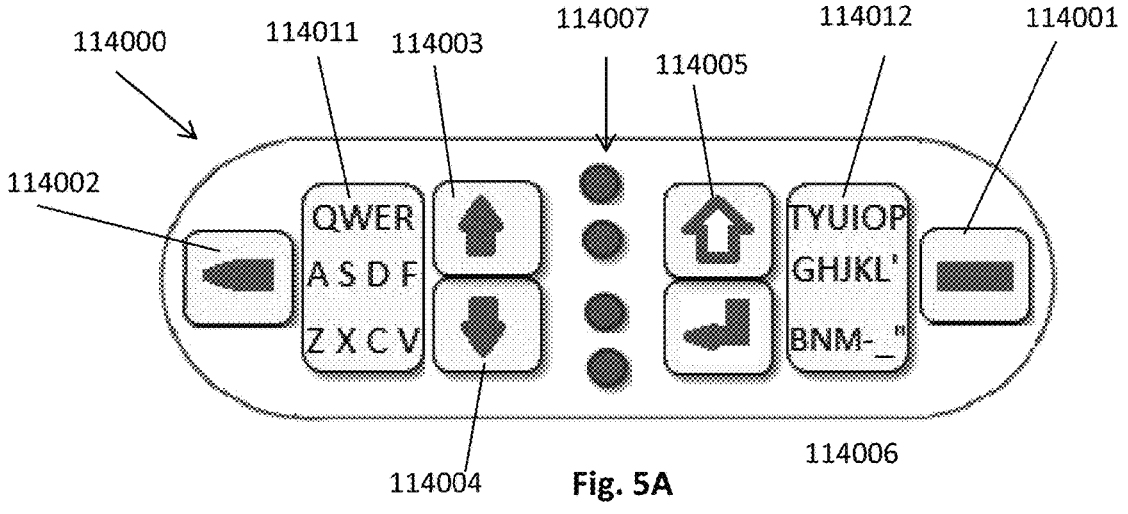
FIG. 4 shows an exemplary remote control device of the invention used with the searching system of the invention for searching videos on demand, in accordance with different exemplary embodiments of the invention.

As an example, such search system may be used for searching titles of movies within a database of titles of movies. For that, the search system may preferably include and/or uses a movie titles database. Preferably, the words of the titles of movies may be organized/represented/arranged in the manner described above by a corresponding number of sequences of digits (e.g. herein may be referred to as a digitized titles). Optionally, a digitized title/word may be created during a search procedure. As an example, by considering the keyboard 113000 of FIG. 4, having two (e.g., left and right) large zones 1130111 and 113112 (e.g. each having three horizontal small zones), the words of the title of the movie "The picture of Dorian Grey", included within a corresponding database, may be represented by respectively the plurality of digitized words as below:

"221 2212211 21 121212 2112".

Such principle may be applied to all of the movie titles of a database of movie titles.

For searching said title, as an example, a user may provide a number of corresponding digits by providing pressing/tapping actions (anywhere) on the corresponding large zones of the keyboard 113000. As an example, for entering two words "picture" and "Dorian", the user may press on:

a) right zone, right zone, left zone, right zone, right zone, left zone, left zone, for the word "picture", and b) left zone, right zone, left zone, right zone, left zone, right zone, for the word "Dorian"

Accordingly, said key presses may be transformed to two digitized words (e.g., herein may be referred to as "digitized keyword/s" or simply "keyword/s") 2212211 and 12112 (e.g., together being a very long number of digits 2212211 and 12112 or, 12112 and 2212211). The system then, may search for titles having (e.g., word with) similar sequences of digitized keywords (e.g., by relating/matching said keywords to appropriate words of the titles) within a database of titles used by the system. The chances of finding many titles that (e.g., in a single title) some (e.g., in this case, two) of their (e.g., corresponding) digitized words match the digitized keywords entered by the user is very low. The system, then, may preferably provide/present the corresponding one or more titles o a user, preferably on the screen of a corresponding device. Note that between said two keywords, preferably, an end of the word signal such as a space character is/should-be provided.

If there are more than one corresponding titles that some (e.g., in this case, two) of their digitized words match the digitized keywords entered by the user, then the user may either navigate within the presented titles or he/she may provide one or more additional sequences of key presses corresponding to one or more additional words of the title (e.g., which may be processed as described above) for narrowing down the search and reducing the number of corresponding titles/candidates (e.g., to be presented on the screen).

After selecting the/a desired title/phrase (e.g., by a user), the system may access the content (e.g., a movie, a song, a document, etc.) corresponding to the selected title and execute a corresponding process (e.g., playing said movie on the screen of the corresponding device, playing the song, presenting a content on the screen, etc.).

Note that, if a word of a title is very long, providing (large) key presses corresponding to said word alone may be enough for predicting a corresponding/said title by the system.

According to one aspect, two or more sequences of key presses may be entered one by one (e.g., by providing an end-of-the-word signal such as by pressing the ENTER key between said sequences). As an example, a user may first enter a first word/keyword of a desired title. If the corresponding titles presented by the system on the screen are large/significant, then, the user may enter a second word/keyword of said title to reduce the number of corresponding choices, and so on, until, preferably, only a few one or more words is/are presented by the system among which the desired title will be present for selection.

According to another aspect, two or more sequences of key presses may be entered together (e.g., one after the other, preferably, by pressing the SPACE key between said sequences).

Preferably, the order of providing entering (e.g. the key presses corresponding to) two or more words may be arbitrary. As an example, in the current example of title, the word "Dorian" may be entered before or after the word "picture".

Note that, the search system of the invention may use any one or more features of the data entry system of the invention. According to a first aspect, for searching a title, a user may sloppily type on the corresponding left and right zones (e.g., for entering digitized keyboards) corresponding to one or more words of a desired title (e.g. until the title appears on the screen).

According to a second aspect, the user may precisely enter at least one or more characters of a desired on or more words (e.g. and enter sloppily the one or more characters of the rest of the characters of said one or more words).

According to one aspect, the search application relies-on/considers only the pressing actions provided by a user on the left and/or right (e.g. large) zones for predicting/selecting one or more corresponding titles.

According to another aspect, in addition to considering the pressing actions provided by a user on the left and/or right zones, the system may also consider other parameters such as on each small zones said pressing actions are provided, and/or other features of the/a data entry system (of the invention) such as calculating penalty values, word-completion, speed of typing, etc.

According to one embodiment of the invention, before and/or during and/or after presenting one or more titles to a user based on user's key/zone presses, the system may present a number of words (e.g. a word list) corresponding to a corresponding provided sequence of key presses to the user. Then, the user may select one of said words that corresponds to a/the desired title (e.g., herein may be referred to as an identified word) for better informing the system about the desired title. In this case, a title presented by the search application will preferably include the selected one or more identified words.

The current methods of search of titles used by the TV industry are very cumbersome. Most of the time an on-screen keyboard is displayed on the screen of the television and a user must navigate within said keyboard through a remote control for selecting the letters corresponding to a title, one by one. The search system of the invention solves the problem of search on TVs.

Looking at a TV screen requires the user's head to be "up" (e.g., watching/focused-on the TV). The search application of the invention may be used for searching titles (e.g., of movies, videos, etc.) on a TV quickly and easily while a user keeps his head "up".

Because the user uses only two large zones/keys, he/she has just to press on two keys (if using one finger) or presses on a single (different) key with each finger (if using two fingers), therefore he/she can always can have his/or head "up".

FIG. 4A shows as an example a device (e.g a remote control, etc.) 113000 having a touch sensitive screen/pad 113001 and an on-screen/a touch sensitive keyboard 113002. Said keyboard has two large zones 113011 and 113012, wherein each of said large zone preferably having three horizontal small zones (e.g., based on principles described before). Said keyboard is used by the search and data entry systems of the invention for searching for (e.g., movie/video) titles and/or texting with others using the TV screen 113010 (e.g., and preferably, the communication system of the set-top box of the TV). For better interaction, an image 113005 of/reflecting the keyboard, showing the arrangement of letters on the left and right large keys of the keyboard 113000 used by the user is preferably displayed on the screen of the TV.

Note that for reducing mistyping, a gap 113003 is provided between the large left and right zones of the keyboard.

In this example, the keyboard does not have a space key or a backspace key and it substantially occupies the entire surface of the device so that to minimize the possibility of typing on a wrong key (e.g. such as an Space key). For entering/providing a backspace input, the user may provide a right-to-left swipe on the keyboard/screen/pad and for providing a space character, the user may provide a left-to-right swipe on the keyboard/screen/pad. For navigating within predicted/proposed titles, the user may swipe up and/or down on the keyboard/screen/pad.

Preferably, the middle row of letter-keys of the keyboard is narrower than other rows of letter keys. This is because, for interacting with a small upper or lower rows of keys, a user may move his/her fingers (e.g., slightly) up or down for pressing/interacting with the upper and lower rows of letter keys.

As shown, the remote control may have one or more (e.g., function keys) preferably physical keys.

With continuous description of the principles of the current patent application, based on the principles described above, according to one aspect, only two (e.g., large) may be used for searching contents (e.g., phrases, titles, etc.) within a database. Accordingly, different devices and/or interfaces having two (e.g., large) keys (e.g., to which at least the letters of an alphabet divided in two groups are assigned) may be designed and/or produced for searching within databases. FIG. 5A shows as an example, a remote control 114000 of TV, for use in landscape position, having two (e.g., physical or virtual) letter-keys 114011 and 114012 to each of which a group of characters of a language are assigned. In this example, the (e.g., letter) key 114011 ambiguously represents the letters/characters that are assigned to the left (e.g., broadly ambiguous) large letter-key/zone 101201 of FIG. 1C, and the (e.g., letter) key 114012 ambiguously represents the letters/characters that are assigned to the right (e.g., broadly ambiguous) large letter-key/zone 101202 of FIG. 1C. By using only these two keys, a user may search a desired phrase (e.g., title) within a database of titles using/based-on the data/text entry system of the invention without the need of looking at the remte control while typing-on/pressing the (e.g., letter) keys having corresponding characters. While typing the corresponding keywords (e.g., digtal words) corresponding to a desired title, the user can continue to look at the TV screen (e.g., while keeping his/her «head-up»). As an example, key 114011 produces the digit «0 » and key 114012 produces the digit «1». Based on one or more sequences of digits produced by tapping on key 114011 and 114012 for typing one more keywords corresponding-to/of a title, the search system using the word predictive system of the invention most probably may present a list of predicted titles including at most a few titles among which the desired title (e.g., almost always) is present. If the list is long (e.g., has many items/titles), the user may type an (e.g., one or more) additional keyword (e.g., corresponding to a word) of the desired title. In ths case, the search system of the invention will/may refine/enhance the search by considering said additional keyword (e.g. for an additional corresponding word of a title) and may produce a reduced list of corresponding titles including the desired title. Note that, in order to find and present a title to the user, said title must be included within the database used by the search system.

Note that, in many cases, the search system may find only one title for one or more keywords provided by a user.

With continuous description of the current embodiment, the remote control device may have additional keys such as a Space key 114001, a backspace key, 114002, the arrow keys 114003 and 114004, for example, for navigating upwards and downward within a list of movie titles presented by the search system, and some other keys including/such as the keys 114007 for controlling the TV.

Figures 5B, 5C:
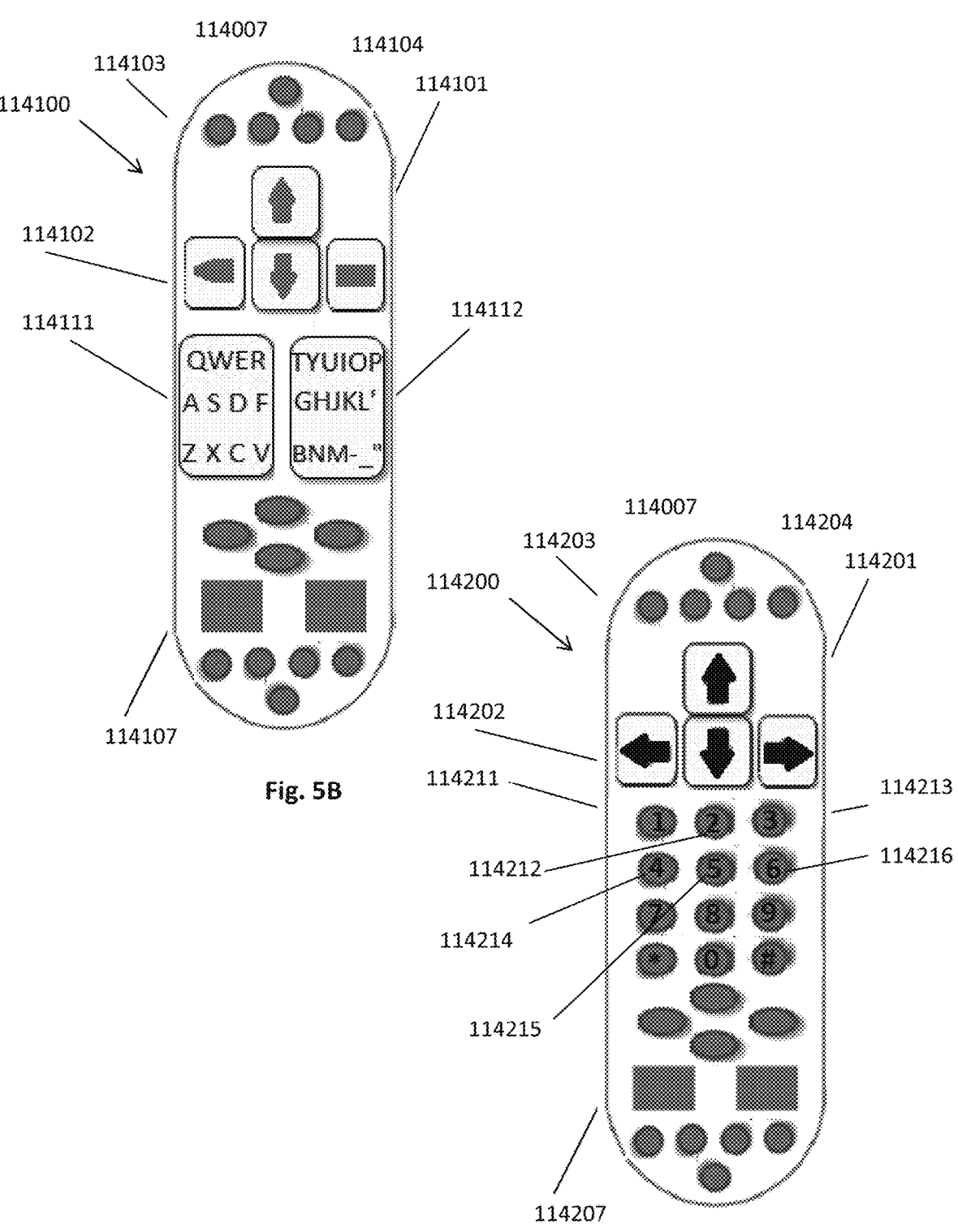

FIG. 5B shows as an example, a remote control 114100 of TV, substantially similar to the remote control of FIG. 5A, but for use in portrait position. In this example, the remote control 114100 has has two letter-keys 114111 and 114112, similar to the keys 114011 and 114012 of FIG. 5A, to each of which a group of characters of a language are assigned.

According to one aspect, at least the two (e.g., large) letter-keys, preferably all of the keys, of a remote control used by the search system may be physical keys, providing a low-cost remote control device. According to another aspect, at least said two (e.g., large) letter-keys may be virtual/soft keys.

The broadly ambiguous keys/zone may be of any size. As an example, said keys/zones may be of a small size such as a few (5-10) millimeters. As an example, the search system of the invention may use a regular/existing remote control of a TV for searching titles. FIG. 5C shows, as an example, a remote control device 114200 having a number-keypad («numpad») representing digits 0 to 9. As and example, the (e.g., small) key 114211 may by used for representing/replicating/duplicating the left broadly ambiguous key 114111 of FIG. 5B, and the (e.g., small) key 114212 may by used for representing/replicating/duplicating the right broadly ambiguous key 114112 of FIG. 5B. A Plurality of (other) keys of an/the (e.g., existing) remote control device may be used by the search system of the invention for representing/replicating/duplicating other keys that can be used by a search procedure/system of the invention. As an example, the keys 114213 to 114216, may be used for representing/entering, respectively, a Beckspace, Space, Clear (e.g., New Search), and Return/Enter functions/characters. It is important to note, any other two keys of an existing remote control may be used for representing/replicating/duplicating any of the broadly ambiguous left and right keys/zones of the invention. It is understood, that any (of said) functions may be assigned to any (other) key of the/a remote control.

According to one aspect, the search application of the invention and the/a corresponding word predictive software of the invention may be implemented within a mobile device such as smartphone for accessing contents through the search system of the invention. According to one method, said device may be used as a remote control (e.g., as well).

The/a title may have/include any type of information. As an example, a title of a movie may have the name of a movie, the name of one or ore people (e.g. actor/s, producer, etc.) related to said movie), year produces, etc.

With regard to principles of the search system of the invention described herein, an exemplary search procedure of the invention is demonstrated below. As an example, for searching the movie title Pretty Woman, according to one aspect, a user may enter two corresponding keywords one by one (e.g., by pressing the Return/Enter key after entering each keyword).

By considering the keyboard of FIG. 5C, after providing a sequence of key presses 114212, 114211, 114211, 114212, 114212, 114212, (e.g., digitized keyword/input 211222) corresponding to the word Pretty, (e.g., and pressing the Space key 114212), as shown in FIG. 5D, the search system of the invention may present a list of corresponding titles 114300 (e.g., from the corresponding/exemplary database of movie titles 112000 of FIG. 3). Note that in this example, because only one (e.g., digitized) keyword is entered, the presented list 114300 includes many movie titles. As such, in FIG. 5D, only exemplary portions 114301, 114302 and 114303, of the complete list of the corresponding presented titles are shown. Note that the list 114300 includes titles that include words 114304 (e.g., Martin, Berlin, Oregon, Beauty, etc.) that correspond to the digitized keyword 211222.

With continuous description of the current example, the user, then, may enter the keyword woman by pressing the keys 114211, 114212, 114212, 114211, 114212 (e.g., corresponding to digitized keyword 12212). Accordingly, the system may preferably present the titles that include words corresponding to both (e.g., digitized) keywords entered by the user. As shown in FIG. 5E, there are only four titles 114400 (e.g., among a list/database of more than 44000 movie titles as listed in/by Wikipedia) that correspond to the two entered keywords (e.g., 211222 and 12212). The title Pretty Woman 114401 is among the presented titles 114400.

It must be noted that, different methods of entering keywords may be considered with the search system of the invention. As an example, according to a first aspect, the keywords may be entered one by one, and the system may present a list of titles corresponding to the keywords entered after entering each keyword. According to a second aspect, the system may present a list of corresponding titles after entering each keypress (e.g., corresponding to a character of a keyword). According to a third aspect, the user may enter a plurality of keywords (e.g. with space characters between the keywords), then may press an end-of-the-keywords signal such as pressing the Return/Enter key (e.g., 114216). Then the system may provide a list of titles corresponding to the entered plurality of keywords. Other aspects may be considered by people skilled in the art.

According to one embodiment of the invention, titles corresponding to one or more keywords entered by a user, wherein said titles are comprised of a number of words equal to the number of said one or more keywords entered by a user, are given priority over other titles corresponding to said keywords wherein said other titles are comprised of a larger number of words than said one or more entered keywords. According to one aspect of the invention, the system may, preferably, at first present the titles that are comprised of a number of words equal to the number of keywords provided by the user.

Figure 5F:
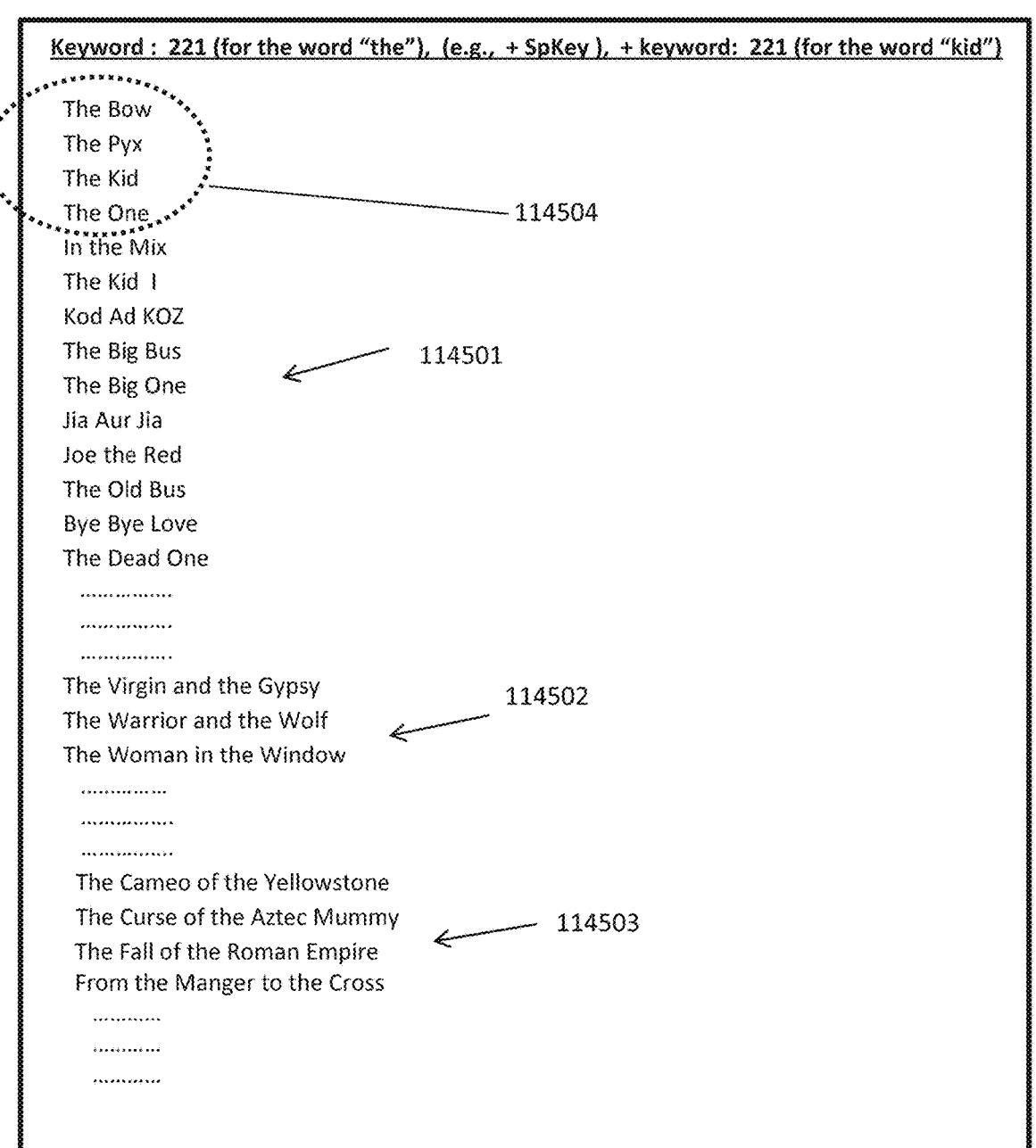

As an example, as shown in FIG. 5F, by considering the (e.g., broadly ambiguous) keys 114211 and 114212 or FIG. 5C, for searching for the movie title «The Kid», the user may provide (e.g., for the keyword «The») a sequence of keypresses on the keys, 114112, 114112, 1141121, (then, 114214, or 114216, respectively on Space key, or Return/ Enter key), then (for the keyword «kid») the user may provide a sequence of keypresses on the keys, 114112, 114112, 1141121, (then, 114214, or 114216, respectively on Space key, or Return/enter key). The corresponding (e.g., entered) digitized keywords are «221», (e.g., then, Spece) and «221». Accordingly, the system may preferably present the titles that each include words that correspond to the both of the digitized keywords. According to a preferred aspect, as shown in FIG. 5F, the system may first present the titles that are comprised of a number of corresponding words equal to the number of keywords provided by the user. In tis example, two keywords are provided, therefore, the system at first presents the corresponding titles 114504 (e.g., including the desired title, «the kid») comprised of two words (e.g., only). According to one aspect, (e.g., below said words 114504, or in a separate/next page), the system, may preferably (e.g., also) show additional titles corresponding to the provided two keywords by the user. Because said additional titles are many/significantly-numerous, only exemplary portions 114501, 114502 and 114503 of said additional titles are shown in FIG. 5F.

As shown in in FIG. 5F, among more than 44000 movie titles (listed in/by Wikipedia) only four titles (e.g., 114504) each comprised of two (short) words corresponds to the two keywords provided by the user.

As demonstrated by the examples above, each digitized keyword is comprised of a sequence of digits. Among a large number of titles, generally, there may be only a few titles that are comprised of a single word corresponding to a provided digitized keyword. Accordingly, there may be only a few titles that are comprised of two word corresponding to two digitized keywords provided by a user. Same is true for titles with larger number of words.

Note that additional keywords may be entered/provide by a user for searching for a title comprised of many words. In this case, most of the time, even a few number (e.g. 2 to 4) of keywords provided by a user may be enough for the system to find and present (e.g., within at most a short list of corresponding titles) the user's corresponding desired title (e.g., having any number of words).

After considering (e.g., as potential candidates), by the system, a number (e.g., one or more) of titles (e.g., herein, may be referred to "selected titles") that at least some, preferably all, of the words of each of said selected titles, correspond to a sequence of keywords entered by a user, several methods (e.g., separately/independently or at least some of said methods combined with each other) for presenting (e.g., displaying on the screen of a corresponding device or reading them through a text to speech system, etc.) at least some of said selected titles to a user may be considered, such as the following exemplary methods:

a) According to one method, the system calculates the total number of related (e.g., matched) words of each selected title and stores a corresponding value (e.g., herein may be referred to as "first total value") for each selected title. The system, then, preferably sorts the selected titles in a decreasing order of their stored first total values. Preferably, the system presents one or more of the sorted titles (e.g., with highest first total values) to a user. Optionally, the system presents all of the sorted titles to the user.

b) Preferably in regard to (e.g., optionally, regardless of) method (a), the presented/selected titles are (e.g., further) preferably sorted in increasing order of their total number of words (e.g., herein may be referred to as "second total values").

c) Preferably in regard to (e.g., optionally, regardless of) method (a), the system calculates the total number of characters of related (e.g., matched) words of each selected title and stores a corresponding value (e.g., herein may be referred to as "third total value") for each selected title. The selected/presented titles are (e.g., further) preferably sorted in a decreasing order of their stored third total values. Preferably, the system presents one or more of the sorted titles (e.g., with highest third total values) to a user. Optionally, the system presents all of the sorted titles to the user.

d) Preferably in regard to (e.g., optionally, regardless of) method (a), the system calculates the total number of characters of each of the related (e.g., matched) words of each selected title that have a same number of related (e.g., matched) words and stores a corresponding value (e.g., herein may be referred to as "fourth total value") for each selected title. The selected/presented titles are (e.g., further) preferably sorted in a decreasing order of their stored fourth total values. Preferably, the system presents one or more of the sorted titles (e.g., with highest fourth total values) to a user. Optionally, the system presents all of the sorted titles to the user.

e) Preferably in regard to (e.g., optionally, regardless of) method (a), for each selected title, the system calculates the total number of related (e.g., matched) words divided by the total number of words and stores a corresponding value (e.g., herein may be referred to as "fifth total value") for each selected title. The selected/ presented titles are (e.g., further) preferably sorted the selected titles in a decreasing order of their stored fifth total values.

Preferably, the system presents one or more of the sorted titles (e.g., with highest fifth total values) to a user. Optionally, the system presents all of the sorted titles to the user. f) Preferably in regard to (e.g., optionally, regardless of) method (a), for each selected title, the system calculates the total number of characters of the related (e.g., matched) words divided by total number of characters and stores a corresponding value (e.g., herein may be referred to as "sixth total value") for each selected title. The system, further/then, preferably sorts the selected titles in a decreasing order of their stored sixth total values. Preferably, the system presents one or more of the sorted titles (e.g., with highest sixth total values) to a user. Optionally, the system presents all of the sorted titles to the user.

g) Preferably in regard to (e.g., optionally, regardless of) method (a), the selected titles that the order of position of at least some (e.g., preferably, all) of their words within a same title matches/corresponds-to the order of at least some of (e.g., preferably, all) of the corresponding keywords entered by a user, may preferably be given priority over selected titles that the order of position of at least some (e.g., preferably, all) of their words within a same title does not match/correspond-to the order of said keywords.

h) According to one aspect, each of the titles of a database may have a (e.g., at least one type (e.g., frequency of use, importance, arbitrary, etc.) of) priority value assigned to it. Preferably in regard to (e.g., optionally, regardless of) method (a), the system (e.g., further) sorts the selected/presented titles in a decreasing order of their priority values. Preferably, the system presents one or more of the sorted titles (e.g., with highest priority values) to a user. Optionally, the system presents all of the sorted titles to the user.

i) According to one embodiment, among the (e.g., selected) titles of a database, the system considers titles that their total number of related/matched words of each of them is equal to or higher than the corresponding keywords.

In general, and specifically in the examples of methods described above, the term "highest values" within a group of values (preferably) means the values above/higher-than a (e.g., predefined or dynamically defined) threshold.

The examples of methods described above are brought to describe the principles of presenting selected words in accordance to the current invention. Other methods of presentation of selected word, based on principles described herein, may be considered by people skilled in the art.

Note that, a giving priority by the system to a (e.g., selected) title, may preferably mean that said (e.g., selected) title is presented to a user (e.g., displayed on the screen) before/above other (e.g., selected) titles.

The presented titles may preferably be interactable. According to one embodiment, after a title is interacted, a function corresponding/assigned to the interacted title may be executed. As a first example, the interacted title may be the title of an Internet article. In this case, said article may be presented to a user (eg., displayed on the screen of the user's device). As a second example, the interacted title may be a telephone number, wherein upon said interaction said number may be dialed. Other functions may be considered based on the principles of the search system of the invention.

According to one aspect, if a title has two or more words that correspond to a single keyword, then, only one of said words may be considered as being related/matched to said single keyword. In this case, an additional similar keyword may be related to an addition word of said two or more words.

According to one embodiment, a title database may include/be-comprised-of numbers (e.g., sequence of digits 0 to 9) such as telephone numbers (e.g., of contacts list of a corresponding user's smartphone. Accordingly, a corresponding keyboard of the invention may include digits as well. In the exemplary keyboard of FIG. 6A digits 0 to 4 are represented/assigned-to the left large key 115201, and digits 5 to 9 are represented/assigned-to the right large key 115202. As such, as an example, a user may type telephone numbers without looking at the corresponding input interface (device). This may be very useful in some situations such as while driving. Because a user's phone contacts database may have at most a few hundreds of contacts, the chances are very high that rge search system of the invention select only one (e.g., or a maximum of a few) corresponding telephone number for a keyword entered by a user.

As shown by the examples provided herein, the search system of the invention, is an accurate breakthrough technology in the field of content search (e.g., based on keywords).

It is important to note that the term "title" and a database of movie titles is/are used as an example for describing the principles of the search application of the invention. As mentioned, the search application described herein may be used for searching any type of content/phrase/term (within a corresponding database) such as movie titles, music titles, song titles, scientific terms, medicine titles/terms, titles formed of one or more sequences of symbols, etc.

Note that, each large zone of the keyboard of the invention having two large zones, may include any of a plurality of characters/letters of an alphabet. Said zones may be in horizontal axis (e.g. for Roman alphabet), or in vertical axis (for Japanese language/alphabet)

According to one embodiment, the search system using the data entry system of the invention may be implemented and run within a mobile device such as a smartphone or tablet, etc. FIG. 6A, shows an on-screen keyboard (e.g., used by the search application) displayed on the screen of a smartphone in landscape mode.

FIG. 6B, shows an on-screen keyboard (e.g., used by the search application) displayed on the screen of a smartphone in portrait mode. In this example, the (e.g. large) zones/keys (e.g., respectively, producing digits 0 and 1) are used for searching titles as described herein this patent application.

Note that the data entry system of the invention may use any type of keyboard such as a keyboard with virtual (letter) keys or with physical (letter) keys.

Note that any of the keyboards described herein are used to demonstrate the principles of the inventions described herein. Any other type of keyboard (e.g. soft, hard, etc.) having any number of keys/zones, any size, any key and/or characters configuration, etc. may be used with the inventions. FIG. 7A shows as an example, a keyboard 116000 having a QWERTY letter-key configuration in which the left (large) zone 116001 and the right (large) zone 116002 each includes a plurality of letter-keys which is different than the corresponding left (large) zone 115101 and the right (large) zone 115102 of the keyboard of FIG. 6B. Said keyboard may be used for searching titles by the search and data entry systems of the invention for predicting titles based on principles described in this patent application.

According to one method, the space key me be assigned to (e.g., at least) one of said large keys and be presented by the digit corresponding to said large key. In ths case, the digitized words of the titles are organized such that to include the digit representing the space key.

The search system of the invention, enables the users (e.g., on the move, in a meeing, etc.) to search for and find his/her desired phrase (e.g., title) within a database without the need of looking at the keyboard by using only two (e.g., large) keys. As an exam a user may find and play a song while jogging.

According to one aspect, a text to speech may be used by the search system of the invention for speaking the corresponding list of titles to the user (e.g., for selecting a desired song).

Also as an example, the searching system may be used by a policeman for searching a content within a registry of contents while driving. And etc.

According to one embodiment, in addition to and/or in replacement of letter key, the keyboard of the invention, the words and digitized words of a database used by the system may include/comprise other characters such as digits and special characters.

The search system of the invention may be used by any language having any type of characters/letters such as alphabetical languages, ideogrammic (e.g., Japanese) languages etc.

According to one aspect, the database uses by the system may include the digitized words. According to another aspect, a digitized word of the database is dynamically created during a search procedure.

It must be noted that although only two broadly ambiguous keys are used to show the principles of the search system of the invention, any other number of ambiguus keys may be used by the search system of the invention based on priciles described herein. As an example, by considering the keyboard of FIG. 1A, the search application of the invention may use six ambiguous keys 101001 to 101006. In this case, interaction with each of said keys may provide a different input signal, such as, respectively, the digits 1 to 6. In this case, digitized words of the titles, and the search procedure may be arranged and executed accordingly.

The principles just described may be applied independently or in combination with other principles defining the degree of ambiguity as described in this application for predicting words.

The principles described may also be applied to swiping principles to type words as described herein. As an example, fast swiping actions may be related to fully ambiguous/predictive mode and slow swiping actions may be related to semi-ambiguous (e.g. semi predictive) mode.

According to one aspect, by using a keyboard of the invention having large and/or small zones, the speed of typing may be measured in each zone independently and/or regardless of the zones.

According to one aspect, measuring the speed of typing and relating it to slow and/or fast and predicting words typing may be applied to any type of keyboard such as traditional keyboard (e.g. QWERTY).

Note that in the embodiments described above, a correcting system may be used with the system so that to relate an impact to any of the characters of the keyboard by relating it to a mistyping action.

Note that all of the principles of the data entry system described herein are used by the data entry system of the invention to predict/present words (e.g. to a user) upon receiving a sequence of interaction with the/a keyboard (e.g. of the invention) by a user for entering a word.

Note that, interaction with keys/zones of a keyboard of the invention may be f any kind. As an example, instead using tapping actions swiping actions or a combination tapping and swiping actions may be used for the same purpose. As an example, providing a swiping action from a left large zone/key to a right large zone/key may be considered as tapping on the left and the right zone/key.

The assignment of a group of characters to a large and/or a small zone may vary. As an example, (e.g., a first row of) a left large zone may include the letters QWERT and (e.g., a first row of) a right large zone may include the letters YUIOP. Also as an example, (e.g., a second row of) a left large zone may include the letters ASDFG and (e.g., a second row of) a right large zone may include the letters HJKL. Etc.

According to one embodiment, the input interface of the invention may be a touch sensitive surface wherein no large keys are precisely defined. In this case, an interaction with a large zone is dynamically defined based on a location of a user's interaction impact on said interface. As an example, if a user taps on a left side of the input interface, said interaction is preferably be related to an interaction with a left large zone. Accordingly, if the user taps on a right side of the input interface, said interaction is preferably be related to an interaction with a corresponding right large zone.

According to one aspect of the invention, selected titles may be presented to a user during the entry of word (e.g., before entering before an end-of-the-word signal).

Thus, while there have been shown and described and pointed out fundamental novel features of the invention as applied to alternative embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto. It is to be understood that the drawings are not necessarily drawn to scale, but that they are merely conceptual in nature.

For example, any other kind of keyboard having any number of keys, any kind of key/zone configuration, any type of keys (e.g. physical/hard keys, touch sensitive keys such as on-screen keys, combination of hard and touch sensitive keys, physical keys with touch sensitive surface, keys/zones dynamically (e.g. during interacting with a touch screen) defined, virtual keys interacted (from far) in the air, any size of keyboard, with any kind of configurations of symbols assigned to its keys, etc., may be used with the inventions, principles, aspects, embodiments, methods, etc., described herein.

Note that according to a general aspect, interacting with different keys/zone of any keyboard or any other input means of an input interface may provide corresponding different input signals. To each of at least some of said input signals a number of letters/characters of a language may ambiguously be assigned. By receiving a sequence of one or more such input signals the word predictive system of the invention may predict a word as described throughout this patent application.

Note that the keyboards, data entry and search systems described in this patent application may be used with and/or integrated within any type of device with any size of the screen such as a Smartwatch, a Smartphone, a tablet, a large screen of or related to a (e.g. wearable) computing device, etc.

Note that all of the principles of the (e.g. word predictive) data entry system of the invention may be used with any of type of keyboard such as those of the current invention.

For not frequently repeating the principles of the data entry system of the invention, in many paragraphs of this application there is mentioned that one or more symbol such as character/word/portion-of-a-word/function, etc., may be assigned to a key (e.g. or an object other than a key). It is understood that unless otherwise mentioned, said symbols, generally, are intended to be assigned to a predefined simplest interaction with said key which may be a single-pressing action on said key.

Note that although in some embodiments a sensitive surface such as a touch-sensitive pad or a touch screen have been used as examples, it is understood that any other technology detecting and analyzing a user's interaction with an object (e.g. from near or remotely) may be used to define interaction with a keyboard. For example, said technology may be an optically detecting technology, or an (e.g. infra-red) IR technology, etc. detecting the user's finger/s touching a virtual keyboard or interacting with it from far (e.g. in the air).

It must be noted that at least one/some of principle, features, aspects, concepts, etc., described throughout this application may be combined together and used in any portion of the description of the invention herein to enhance the invention.

Note that any electronic device such as a mobile phone, tablet, smartwatch, etc. may be used by any of the inventions, concepts, aspects, principles etc. described within this patent application or with any other application and/or product.

Note that at least one or more of the inventions, concepts, aspects, principles etc. described within this patent application can be used separately or in combination within this patent application or with any other application and/or product.

Note that the keys/zones may be of any kind such as mechanical/hard, virtual/on-screen, pad, touch sensitive surface, etc., or combinations of them.

Note that any of the keyboards described herein are used to demonstrate the principles of the inventions described herein. Any other type of keyboard (e.g. soft, hard, etc.) having any number of keys/zones, any size, any key and/or characters configuration, etc. may be used with the inventions.

It must also be noted, that any of the systems, features, means, methods, etc., described in this patent application may be used separately or being combined with or replace systems, features, means, methods, etc., of other different embodiments of this patent application. Note that a keyboard may have any number of large zones (e.g. 1, 2, 3, or more).

For example, the keys/zone of the keyboard may be defined dynamically when a user touches a location on the keyboard. In this case at least some of the characters near the user's finger impact on the keyboard define a (e.g. an ambiguous) key/zone. Said zone may preferably be horizontal zones (e.g. the characters in the corresponding horizontal direction are selected).

Note that although the term(s) keys/zones are used to describe providing input information for entering text, any other input means may be used for the same. In general, the system may receive a sequence of at least one input signal ambiguously corresponding to a group of characters and/or precisely corresponding to an identified character from any input means to predict a word.

Note that any of the data entry systems and/or input means described in this application may be applied to and/or integrated with devices with screens of any size such as a smartwatch, a smartphone, a tablet, and devices with larger screens.

Note that all principles, methods, systems, embodiments, features, functions, etc. described in this application are not limited to the examples described herein. They may be used for a broader purpose. Note that according to one aspect the keyboard may include any number of large zones each including any number of small zones.

It must be noted that in some portions of this application an invention may be described by referring to a specific content and/or function, it is understood that any other content and/or function may be used with any invention described herein.

The invention claimed is:

1. A system for searching contents, running within a device, comprising:

a keyboard having two keys to which at least all of the letters of a language are assigned;
a word predictive software, and
a database of textual contents;

wherein upon providing a sequence of keywords by interacting with said two keys, the word predictive system relates a number of said keywords to one or more words of at least one of said textual contents within said database and selects at least one of the textual contents with related words, and wherein the system calculates the total number of related words of each of the selected textual content and stores a corresponding value for each of said selected textual contents, and wherein the system, further, sorts the selected textual content in an decreasing order of the stored values, and presents one or more of sorted textual contents to a user.

2. The system of claim 1, wherein the system presents a portion of the sorted the textual contents with the highest corresponding values.

3. The system of claim 1, wherein the system presents all of the sorted textual contents.

4. The system of claim 1, wherein, further, the presented textual contents are sorted based on ascending order of their corresponding total number of words.

5. The system of claim 1, wherein, further, the presented textual contents are sorted based on descending order of the total number of characters of the related words of each textual content.

6. The system of claim 1, wherein, further, the presented textual contents are sorted based on descending order of the total number of related words divided by the total number of words, of each textual content.

7. The system of claim 1, wherein, further, the presented textual contents are sorted based on descending order of the total number of characters of related words divided by total number of characters of each of the textual contents.

8. The system of claim 1, wherein said the presented textual contents are displayed on a screen of the user's device.

9. The system of claim 1, wherein, further, to each of the textual contents a priority value is assigned, and wherein the presented textual contents are sorted based on descending order of the priority values of said textual contents.

10. The system of claim 1, wherein among the selected textual contents with similar number of related words, the system gives priority to textual contents that the order of the related words of each of them corresponds to the order of the entry of the corresponding keywords.

11. The system of claim 1, wherein said textual contents include letters.

12. The system of claim 1, wherein said textual contents include digits.

13. The system of claim 1, wherein said textual contents are predefined messages.

* * * * *